United States Patent [19]
Ashby, III et al.

[11] Patent Number: 5,150,401
[45] Date of Patent: Sep. 22, 1992

[54] RETROFITTABLE ENCRYPTION/DECRYPTION APPARATUS USING MODIFIED FREQUENCY MODULATION

[75] Inventors: James C. Ashby, III, Priddy; Clark Burkhart, Azle; Frankie B. Favors, Ft. Worth; Roy G. Tiemann, Priddy; Robert L. Vandaveer, Portsville; Lothar A. Krause, Jr., Irving, all of Tex.

[73] Assignee: Chips International, Inc., Priddy, Tex.

[21] Appl. No.: 621,476

[22] Filed: Dec. 4, 1990

[51] Int. Cl.⁵ .............................................. H04K 1/00
[52] U.S. Cl. ...................................... 380/29; 380/28; 380/34; 380/39
[58] Field of Search ...................... 380/28, 29, 31, 33, 380/34, 38, 39, 40, 49; 341/72

[56] References Cited

U.S. PATENT DOCUMENTS

| | | |
|---|---|---|
| 4,027,243 | 5/1977 | Stackhouse et al. |
| 4,126,761 | 11/1978 | Graupe et al. |
| 4,160,120 | 7/1979 | Barnes et al. |
| 4,167,700 | 9/1979 | Coe et al. |
| 4,274,085 | 6/1981 | Marino |
| 4,283,298 | 5/1983 | Evans |
| 4,312,070 | 1/1982 | Coombes et al. |
| 4,612,414 | 9/1986 | Juang |
| 4,622,680 | 11/1986 | Zinzer |
| 4,757,536 | 7/1988 | Szczutkowski et al. ............... 380/48 |
| 4,817,146 | 3/1989 | Szczutkowski |
| 4,852,166 | 7/1989 | Masson ............... 380/48 X |
| 5,007,050 | 4/1991 | Kasparian et al. ............... 380/48 X |
| 5,028,922 | 7/1991 | Huang ............... 341/72 X |

OTHER PUBLICATIONS

Affidavit of Roy G. Tiemann.
Affidavit of Clark Burkhart.
Affidavit of Robert L. Vandaveer.
Affidavit of Joe W. Sutter.
Affidavit of Ted A. Garber.

Primary Examiner—Tod R. Swann
Attorney, Agent, or Firm—Arnold, White & Durkee

[57] ABSTRACT

A communication system for providing secured communication over a communication channel. The system includes a DES encryption device and a DES decryption device retrofittable into or within a conventional radio unit. The encryption device receives analog input at the transmitter end of the radio and converts the analog signal to digital signal, then encrypts this digital data, modulates the encrypted digital data using modified frequency modulation (MFM) which is then sent over the communication path. During decryption, the apparatus receives MFM data from the communication path, demodulates this digital data, decrypts the data and then outputs this decrypted digital data to the interface unit. The interface unit contains both a transmitter and a receiver which is capable of half duplex operation. The interface unit also contains a voice coder and a voice decoder which are of the sub-band type. The interface unit further contains a method for selecting from either a digital data transceiver or a voice coded digital data transceiver. Still further, the apparatus contains a method for selectively controlling the authorized reception for digital data by a single receiver or a plurality of receivers. Also, a method is available for selecting one of a plurality of master keys, which are used for the encryption process initialization. Still further, the present system allows for encrypting and decrypting the digital data by exclusive-oring the digital data with the operative digital encryption device which is implemented in DES.

21 Claims, 15 Drawing Sheets

PORT 0/1 RESERVED FOR THE
DSP'S CODEC INTERFACE

PORT 2 R/W BUSS TO THE DED
75 COON

PORT 3 READ/WRITE THIS IS A
READ BACK PORT
BIT 0 KEYACTIVE TO L.E.D.
BIT 1 CLRLED TO L.E.D.
BIT 2 LED 1 MODE 1 TO L.E.D.
BIT 3 LED 2 MODE 2 TO L.E.D.
BIT 4 LED 3 MODE 3 TO L.E.D.
BIT 5 BEEP ENABLE
BIT 6 ENABLE AUTOINCREMENT (SRAM)
BIT 7 CLEAR THE ADDRESS
      COUNTER (SRAM)
BIT 8 FLASH ENABLE KEYACTIVE
      L.E.D.
BIT 9 FLASH ENABLE CLEAR L.E.D.
BIT 10 FLASH ENABLE MODE 1 L.E.D.
BIT 11 FLASH ENABLE MODE 2 L.E.D.
BIT 12 FLASH ENABLE MODE 3 L.E.D.
BIT 13 TONE SELECT 0=1.125K 1=4.5KHZ
BIT 14
BIT 15

PORT 4 READ/WRITE THIS IS A
READ BACK PORT
BIT 0 ZA/B        TO USART
BIT 1 ZD/C        TO USART
BIT 2 STATUS      TO D.E.D.
BIT 3 CMD         TO D.E.D.
BIT 4 SECURE      TO ANALOG
      INTERFACE
BIT 5 NORMAL      TO ANALOG
      INTERFACE
BIT 6 WDT RESET   TO P.G.A.
BIT 7
BIT 8
BIT 9
BIT 10
BIT 11
BIT 12 BIT 0 ◻ MODEM
BIT 13 BIT 1 ◻ SPEED
BIT 14 BIT 2 ◻ SELECT
BIT 15 BIT 3 ◻ WORD

PORT 5 READ ONLY

BIT 0 SWCLR ◻
BIT 1 SW1 ◻
BIT 2 SW2 ◻
BIT 3 SW3 ◻ ◻
BIT 4 KEYOFF ◻ ◻ FROM KEYBOARD
BIT 5 KEYON ◻
BIT 6 KEYST ◻
BIT 7 KEYPGM ◻
BIT 8 /PTT
BIT 9
BIT 10
BIT 11
BIT 12
BIT 13 ODAV
BIT 14 BUSY
BIT 15 ALARM DET.

WRITE ONLY SRAM ADDRESS LATCH

BIT 0-BIT 15 65536 BYTES
             ADDRESSABLE

PORT 6 READ/WRITE
USART Z85C30 DATA/
COMMAND PORT

PORT 7 READ/WRITE
STATIC RANDOM ACCESS
MEMORY CHIP SELECT

Fig. 10

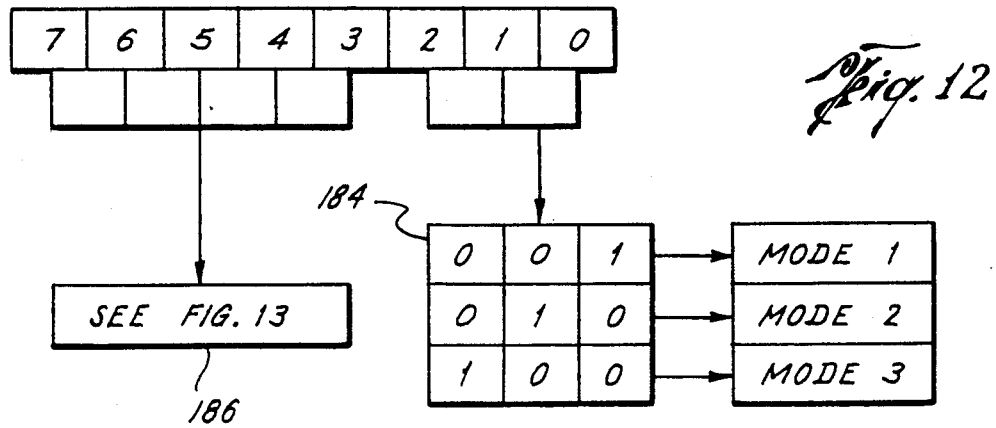

Fig. 13

| 188 | 190 | | | | | 192 |
|-----|---|---|---|---|---|-----|
| 00 | 0 | 0 | 0 | 0 | 0 | VOICE DATA FOLLOWS |
| 01 | 0 | 0 | 0 | 0 | 1 | VOICE DATA |
| 02 | 0 | 0 | 0 | 1 | 0 | RESPONSE REQUEST |
| 03 | 0 | 0 | 0 | 1 | 1 | RESPONSE MESSAGE REQUEST |
| 04 | 0 | 0 | 1 | 0 | 0 | SET MASTER KEY #1 |
| 05 | 0 | 0 | 1 | 0 | 1 | SET MASTER KEY #2 |
| 06 | 0 | 0 | 1 | 1 | 0 | SET MASTER KEY #3 |
| 07 | 0 | 0 | 1 | 1 | 1 | SET DCS #1 |
| 08 | 0 | 1 | 0 | 0 | 0 | SET DCS #2 |
| 09 | 0 | 1 | 0 | 0 | 1 | SET DCS #3 |
| 0A | 0 | 1 | 0 | 1 | 0 | ENTER A NEW ID NUMBER |
| 0B | 0 | 1 | 0 | 1 | 1 | KILL MAIN MEMORY DATA (BRAIN DEAD) |
| 0C | 0 | 1 | 1 | 0 | 0 | VOICE MAIL DATA FOLLOWS |
| 0D | 0 | 1 | 1 | 0 | 1 | VOICE MAIL DATA |
| 0E | 0 | 1 | 1 | 1 | 0 | TALK AND RUN TO BASE |
| 0F | 0 | 1 | 1 | 1 | 1 | RESERVED FOR FUTURE OPTIONS |
| 10 | 1 | 0 | 0 | 0 | 0 | AUXILIARY DATA FOLLOWS |
| 11 | 1 | 0 | 0 | 0 | 1 | AUXILIARY DATA |
| 12 | 1 | 0 | 0 | 1 | 0 | SELECT 9.6K BAUD |
| 13 | 1 | 0 | 0 | 1 | 1 | SELECT 7.8K BAUD |
| 14 | 1 | 0 | 1 | 0 | 0 | SELECT 4.8K BAUD |
| 15 | 1 | 0 | 1 | 0 | 1 | SELECT 2.4K BAUD |
| 16 | 1 | 0 | 1 | 1 | 0 | SELECT 1.2K BAUD |
| 17 | 1 | 0 | 1 | 1 | 1 | RESERVED FOR FUTURE OPTIONS |
| ... | | | | | | |
| 1E | 1 | 1 | 1 | 1 | 0 | RESERVED FOR FUTURE OPTIONS |
| 1F | 1 | 1 | 1 | 1 | 1 | RESERVED FOR FUTURE OPTIONS |

Fig. 16

| | |
|---|---|
| 1 | BF4 BIT 1,2 |
| 2 | BFC BIT 1,2 |
| 3 | BF14 BIT 1,2 |
| 4 | BF1C BIT 1,2 |
| 5 | BF2 BIT 1 |
| 6 | BF6 BIT 1 |
| 7 | BFA BIT 1 |
| 8 | BFE BIT 1 |
| 9 | BF12 BIT 1 |
| 10 | BF16 BIT 1 |
| 11 | BF1A BIT 1 |
| 12 | BF1E BIT 1 |

Fig. 15

| SUB-BANDS | PRODUCT CODE BUFFER REGISTERS | LEVELS PER PRODUCT CODE | BITS SUB-TOTAL |
|---|---|---|---|
| 2000-3000 | BF3, BF7, BFB, BFF, BF13, BF17, BF1B, BF1F | 3 LEVELS 2 BITS | 16 |
| 1000-2000 | BF2, BF6, BFA, BFE, BF12, BF16, BF1A, BF1E | 3 LEVELS 2 BITS | 16 |
| 500-1000 | BF4, BFC, BF14, BF1C | 7 LEVELS 3 BITS | 12 |
| 250-500 | BF8, BF18 | 12 LEVELS 4 BITS | 8 |
| | | TOTAL BITS | 52 |

NORMAL DATA

| BITS | 7 | 6 | 5 | 4 | 3 | 2 | 1 | 0 |
|---|---|---|---|---|---|---|---|---|
| | 8 | 7 | 6 | 5 | 4 | 3 | 2 | 1 |
| | 16 | 15 | 14 | 13 | 12 | 11 | 10 | 9 |

INTERLEAVED DATA

| BITS | 7 | 6 | 5 | 4 | 3 | 2 | 1 | 0 |
|---|---|---|---|---|---|---|---|---|
| | 8 | 15 | 6 | 13 | 4 | 11 | 2 | 9 |
| | 16 | 7 | 14 | 5 | 12 | 3 | 10 | 1 |

| 7<br>BFF-1 | 6<br>BFF-0 | 5<br>BFB-1 | 4<br>BFB-0 | 3<br>BF7-1 | 2<br>BF7-0 | 1<br>BF3-1 | 0<br>BF3-0 |
|---|---|---|---|---|---|---|---|
| 15<br>BF1F-1 | 14<br>BF1F-0 | 13<br>BF1B-1 | 12<br>BF1B-0 | 11<br>BF17-1 | 10<br>BF17-0 | 9<br>BF13-1 | 8<br>BF13-0 |
| 23<br>BFE-1 | 22<br>BFE-0 | 21<br>BFA-1 | 20<br>BFA-0 | 19<br>BF6-1 | 18<br>BF6-0 | 17<br>BF2-1 | 16<br>BF2-0 |
| 31<br>BF1E-1 | 30<br>BF1E-0 | 29<br>BF1A-1 | 28<br>BF1A-0 | 27<br>BF16-1 | 26<br>BF16-0 | 25<br>BF12-1 | 24<br>BF12-0 |
| 39 □<br>BF18-1 | 38 □<br>BF18-0 | 37<br>BFC-2 | 36<br>BFC-1 | 35<br>BFC-0 | 34<br>BF4-2 | 33<br>BF4-1 | 32<br>BF4-0 |
| 47 □<br>BF18-3 | 46 □<br>BF18-2 | 45<br>BF1C-2 | 44<br>BF1C-1 | 43<br>BF1C-0 | 42<br>BF14-2 | 41<br>BF14-1 | 40<br>BF14-0 |
| 55 □<br>HB2-0 | 54 □<br>HB1-2 | 53 □<br>HB1-1 | 52 □<br>HB1-0 | 51<br>BF8-3 | 50<br>BF8-2 | 49<br>BF8-1 | 48<br>BF8-0 |
| 63 □<br>HB4-2 | 62 □<br>HB4-1 | 61 □<br>HB4-0 | 60 □<br>HB3-2 | 59 □<br>HB3-1 | 58 □<br>HB3-0 | 57 □<br>HB2-2 | 56 □<br>HB2-1 |

MATRIX POSITION → | 0 □ | ← □ INDICATES RBT

BUFFER FILTER OR → | BF3-0 | ← -0 INDICATES BIT 0 OF
HAMMING NUMBER                PRODUCT CODE

Fig. 19A

| SLAVE PROLOGUE 224 BITS | | |
|---|---|---|
| SYNC | COMMAND | ADDRESS |
| 64 | 32 | 128 |

| PROGRAM PROLOGUE 288 BITS | | | |
|---|---|---|---|
| SYNC | COMMAND | ADDRESS | DATA |
| 64 | 32 | 128 | 64 |

| DATA PROLOGUE | | | | | | | |
|---|---|---|---|---|---|---|---|
| SYNC | COMMAND | ADDRESS | DATA 1 | DATA 2 | | DATA 15 | DATA 16 |
| 64 | 32 | 128 | 16 | 16 | | 16 | 16 |

RETROFITTABLE ENCRYPTION/DECRYPTION APPARATUS USING MODIFIED FREQUENCY MODULATION

BACKGROUND OF THE INVENTION

The present invention relates to the art of cryptography and, more specifically, to the implementation of improved techniques for achieving voice and/or data communication security over a radio and/or telephone channel.

Cryptography generally relates to the art of protecting sensitive communications against unauthorized access. The proliferation of electronic eavesdropping into sensitive police and military communications has spurred industry to create encryption/decryption devices which prevent such eavesdropping.

Techniques of encrypting or scrambling of radio or telephone signals can take on many forms. Scrambling can go from simple analog encryption to sophisticated digital encryption. Analog scrambling, which makes use of filtering schemes, inverting schemes and split-band audio schemes is generally easier to incorporate into the radio communication channel than digital scrambling, however, it is much easier for unauthorized users to unscramble an analog-scrambled voice than it is for them to unscramble digital-scrambled voice. Digital encryption, is more difficult to unscramble since it converts the voice to binary bits, scrambles the bits, then transmits the scrambled bits over the communication channel. Thus, the digital system makes unauthorized descrambling or deciphering difficult since all the intruding user "sees" is scrambled bit representation of voice and not scrambled voice itself.

Generally, the three functional blocks used in a digital speech encryption device are: (1) voice coder/decoder; (2) encryption/decryption algorithm, and (3) modulation/demodulation methodology. The voice coder/decoder block functions by first coding analog voice samples and then compressing those samples into a smaller number of binary bits. Thus, when combined with a suitable modulation methodology, the voice coder allows transmission over a communication channel of a smaller, specified bandwidth, and provides intelligible reproduction or decoding via the decode block on the receive end. The first generation voice coder/decoders were linear predictive coders (LPC-10) as discussed in Federal Information Processing Standards Publication (FIPS PUB) No. 137, U.S. Dept. of Commerce, NTIS, 5285 Post Royal Road, Springfield, Va. 22161, published on Nov. 28, 1984. Since FIPS PUB 137, other forms of voice coders arose such as: (1) continuously variable slope delta (CVSD) modulation, described in U.S. Pat. No. 4,167,700, (2) sub-band coding described in T. P. Barnwell et al., "A Real-Time Speech Sub-Band Coder Using the TMS 32010," IEEE Southcon. (1984), (3) hybrid sub-band coders described in U.S. Pat. No. 4,817,146, and (4) recent coders which include Code Excited Linear Prediction (CELP) Type Coders and Improved Multi-Band Excitation (IMBE) Voice Coders as described in *Proceedings of ICASSP* (1990), pp. 5-8, 177-180 and 465-468. In addition, there are some very low bit rate laboratory voice coders being developed. An exemplary said voice coder is described in Y. J. Liu, "A High-Quality Speech Coder at 600 BPS", *Proceedings of ICASSP* (1990), pp. 645-648.

Although, voice coder/decoders of the conventional art can adequately interface with many different and suitable modulation/demodulation methodologies, typical voice coder/decoders must transmit large numbers of bits per second (BPS) in order to achieve commercial quality voice reproduction. For example, CVSD requires 12,000 BPS while sub-band coding and hybrid sub-band coding requires 9,600 BPS. However, in order to achieve suitable encryption/decryption over conventional channels, the selected coder/decoder must be combined with a modulation methodology that achieves adequate voice reproduction within the bandwidth restrictions of the particular channel.

The next functional block or, encryption/decryption block, is generally designed either to protect classified information or to protect sensitive but unclassified information. One conventional encryption technique used to prevent eavesdropping of sensitive but unclassified information is data encryption standard (DES). DES has become the standard algorithm used for sensitive, non-military applications such as, e.g., police communication. DES is fully explained in FIPS Pub. No. 46, U.S. Dept. of Commerce, NTIS, 5285 Post Royal Road, Springfield, Va. 22161, published on Jan. 22, 1988.

The third functional block or, modulation/demodulation methodology, is known in the art and can be described in M. Schwartz, *Information, Transmission, Modulation and Noise*, McGraw Hill, (3rd Edition, 1980); I. Korn, *Digital Communications*, (1st Edition, (2nd Edition, 1989). It is important when modulating or demodulating in a secure communication path, that efficient use be made of the frequency spectrum. Unless properly filtered conventional modulation techniques, such as frequency shift keying (FSK), minimum shift keying (MSK) or phase shift keying (PSK), occupy too wide a bandwith for the governmental standard of 15 KHz channels at the required data rates/hertz for all but the latest voice coders.

Conventional digital voice encryption devices which utilize DES standard encryption/decryption typically require a large frequency spectrum and often do not meet the government specified 15 KHz standard communications channel. Thus, new radio equipment must be purchased with government approval to allow deviation from the standard bandwidth in the digital mode, thereby forcing consumers to dispose of their older units. Also, conventional digital voice encryption systems may require linear response amplifiers and intermediate filters (IF), which again causes consumers to dispose of their older units.

A new digital radio standard is currently being devised by the government to achieve increased spectrum efficiency by narrowing the bandwidth in a portion of the spectrum to about 6.5 KHz, versus the current 15 KHz. Modulation methodologies such as 4-ary FSK, Generalized Tamed Frequency Modulation (GTFM), Quadrature Differential Phase Shift Keying (QDPSK), and pi/4 Shift QDPSK will be used to accomplish efficiency. These modulation techniques cannot achieve sufficient efficiency when designed into conventional radio transmitters without wholesale redesigning of the radio itself. This method will force consumers to purchase new radio equipment to obtain digital encryption capability.

Many consumers have older radios approved for the standard 15 KHz bandwidth channels which are not presently capable of being converted to include digital encryption capability. If the end user wishes to transmit data, as well as voice, conventional devices cannot automatically transmit and receive secure signals at numerous data and voice transmission rates. Nor can conventional devices permit the user to alternatively send a secure message through external Data Terminal Equipment (DTE) such as a keyboard, etc., or send a secure voice message at a slower speed for playback at the receiver at full speed. Furthermore, presently available devices have not been designed to automatically adapt the voice coder to a changing bit error rate (BER) environment, such as that found in a radio channel.

SUMMARY OF THE INVENTION

The problems outlined above are in large part solved by the device of the present invention. That is, the improved digital encryption device hereof provides retrofittability with existing, spectrally inefficient radios. The retrofitted radios allow digital encryption/decryption communication between a portable unit to a satellite receiver, through a repeater, through a base station receiver, through telephone lines and/or through audio interconnect and patching systems. Bit compression technique using modified frequency modulation (MFM) allows modulated encryption signals to be transmitted through a radio or radio/telephone channel at substantially large bit/Hz ratios such that commercial quality voice and/or data is achieved over a relatively narrow bandwidth. MFM compression and modulation can, for example, provide 12,000 BPS data rate at a maximum frequency of 6,000 Hz. 6,000 Hz frequency is suitable for recovery while remaining within the 15,000 Hz bandwidth required by government-FCC standards. The encryption/decryption system of the present device thereby utilizes sub-band coding as its voice coder/decoder with DES-type encryption/decryption format, but within MFM for its modulation/demodulation methodology.

In addition to being able to adapt and retrofit with existing linear or nonlinear radios, the present invention also can transmit or receive secure signals at various data rates. A data bit stream or voice can be sent through the secure communication channel of the present invention at slower speed for playback or at full speed. A changing bit error rate (BER) and problems associated therewith are solved through the present invention by its ability to automatically change the voice coder to intelligibly adapt to changing BER. During the reception of a master prologue, the hamming decoding bit determines the BER. The sub-band decoder changes the adaptive pulse code modulation (APCM) coefficients to offset the robustness of the decoder making the decoded audio less susceptible to noise.

The present invention thereby provides a voice/data encryption system (VDES) for insertion into an existing radio communication path. The VDES is installed at each radio port for compatibility with existing governmental DES encryption methodology. Further, VDES in combination with external data terminal equipment (DTE), offers the added ability to encrypt and decrypt digital data from an auxiliary serial data port. The auxiliary serial data port may include an RS232 port and is capable of adapting to a plurality of baud rates. As defined herein, RS232 is Electrical Industrial Standard V.24 and V.28 as referenced in Amateur Radio Relay Leagues Handbook pp. 19-29. Master keys or DES codes can be changed periodically via the auxiliary data port using a hand held programmer. Thus, air rekeying of the master keys is possible through the data port.

The VDES unit can transmit a prologue block which will control all of the command functions over the communication path, i.e., air or telephone line. The prologue block may include a sub-block enabling the authorized receiving unit to load proper master key and decrypt the message regardless of whether it is voice or data. Thus, the master key need not be transmitted. The prologue may also contain the ability to erase master key memory or change master key data when properly addressed and instructed. Furthermore, the VDES, when properly instructed, can activate the push to talk (PTT) sequence, will incorporate a method to code voice into an efficient size for storing and transmission while maintaining communication quality transmission, will also contain a method to modulate the digital information compatible with various communication channel baud rates and adaptable to various bit area environments.

Broadly speaking, the present invention contemplates a communication system for providing secure communication over a radio channel. The system comprises a conventional radio capable of transmitting and receiving non-secure analog signals. Retrofitted into the conventional radio are means for converting the radio into a DES-encryption device including, a codec, a signal processor, exclusive-oring means and a modem. The codec is coupled to receive the non-secure analog signals and convert those signals into pulse code modulated digital (PCM) signals. The signal processor then receives the pulse code modulated signals and converts those signals into a plurality of sub-band codes in response to a series of prologues transmitted over the radio channel. DES codes and sub-band codes are then exclusive-ored to produce modified DES-encrypted signals. The modified DES-encrypted signals are then transmitted over the radio channel by the modem in MFM format in response to the prologues transmitted over the radio channel. After the DES-encrypted signals are transmitted, means are provided for converting the radio into a DES-decryption device including, the modem, the signal processor and the codec. The modem receives the modified DES-encrypted signals and converts those signals from MFM to NRZ format. The signal processor then receives the NRZ-formatted signals and performs DES-decryption and sub-band decoding of those signals. The decrypted and decoded signals are then converted into analog output by the codec.

The communication system can provide secure communication over either a radio channel or a telephone line such that conversations over radio waves and/or telephone lines can be maintained in security. In addition, the communication system further includes means for retrofitting the radio with a plurality of panel controls including a plurality of secure modes and operation modes. The system also includes a universal synchronous/asynchronous receiver/transmitter (USART) having an auxiliary port for receiving auxiliary data from an external data terminal. The auxiliary data sent from the external data terminal source includes fax messages, digitized video and/or ASCII data. Because the present system includes a USART having a programmable baud rate generator, multiple baud rates are received or transmitted between the modem and the auxiliary data port.

The present invention further contemplates a device for converting analog signals to modified DES-encrypted digital signals and transmitting the modified DES-encrypted signals over a radio channel. The device includes a conventional radio having a microphone capable of receiving the analog signals. A codec, retrofitted within the radio, is used for receiving the analog signals and for converting those signals into digital, pulse code modulated (PCM) signals. A digital signal processor having a memory medium, retrofitted within the radio, is used for receiving and compressing each PCM signal into a plurality of sub-band codes and storing each sub-band code within the medium in accordance with a predetermined encoding algorithm. Means are provided for selecting a DES encryption code from a data encryption device and then exclusive-oring the stored sub-band codes with stored DES codes to produce modified DES-encrypted signals. A series of prologues can then be transmitted over the radio channel for controlling the DES-encrypted signals from at least one remote location. A modem is used for transmitting the DES-encrypted signals into MFM format in response to the prologue signals.

The present device functions as customizable circuitry for interconnecting encryption devices such as the codec, digital signal processor, data encryption device and memory medium into the conventional radio to convert the radio into an encryption/decryption device. The customizable circuitry may include, but is not limited to, a programmable gate array, a programmable logic device, an erasable programmable logic device or a field programmable logic device. The memory medium may include a static random access memory with battery backup. The data encryption device further operates in the output feedback mode of operation.

The present invention further contemplates a device for converting modified DES-encrypted digital signals received over a radio channel to analog signals. The device includes a conventional radio having an antenna capable of receiving the modified DES-encrypted digital signals. A modem, retrofitted within the radio, is used for converting from MFM format to serial NRZ format, the modified DES-encrypted signals. Means, retrofitted within the radio, is used for data bit converting the serial NRZ format to 8-bit parallel NRZ format, and for stripping control data bits from the serial NRZ format and for forward error correcting bit errors discovered within the serial NRZ format. The digital signal processor, retrofitted within the radio, is programmed to receive the 8-bit parallel NRZ format and perform DES-decryption and sub-band decoding of signals. Also, retrofitted within the radio, is a codec coupled to convert the decrypted and decoded signals into analog output. An amplifying means, coupled to the analog output, amplifies that output as sound waves detectable by the listener. The amplifying means further includes a speaker means for listening to non-secure amplified analog output from the radio.

The present invention shall also provide a control "talk & run" via front panel controls, to free the user from any other action other than the activation of "push to talk" in order to transfer a voice message to an assigned base unit. After the user has completed the transfer of voice and has released the push to talk button, the present system will transfer the voice message at 4800 baud to the base unit once the radio channel is cleared. The base unit can then play the message at full speed after the entire message is received.

BRIEF DESCRIPTION OF THE DRAWINGS

These and other features of the invention will be more clearly understood upon study of the detailed description of the invention, below, together with the drawings in which:

FIG. 10 is a block diagram of eight I/O ports addressable by the digital signal processor of the present invention;

FIG. 11 is a table showing the pin assignments of the auxiliary RS232 serial port connector used in the present invention;

FIG. 12 is a block diagram of the command word format used in all prologues of the present invention;

FIG. 13 is a chart showing command bits and respective command bit function on master prologue used in the present invention;

FIG. 14 is a table showing sub-bands and the number of product code levels used by the sub-band coder of the present invention;

FIG. 15 is a table showing sub-bands, product code buffer registers, levels per product code and bit subtotal required for each sub-band frequency range;

FIG. 16 is a table of the most error sensitive bits produced by the sub-band coder of the present invention;

FIG. 17 is a table of the packing methodology used by the present invention;

FIG. 18 is a table showing the interleaving methodology used by the present invention;

FIG. 19 are three tables showing secondary prologues, i.e., slave prologue, program prologue and data prologue, used in the present invention.

DETAILED DESCRIPTION OF THE PREFERRED EMBODIMENTS

Figure 1:
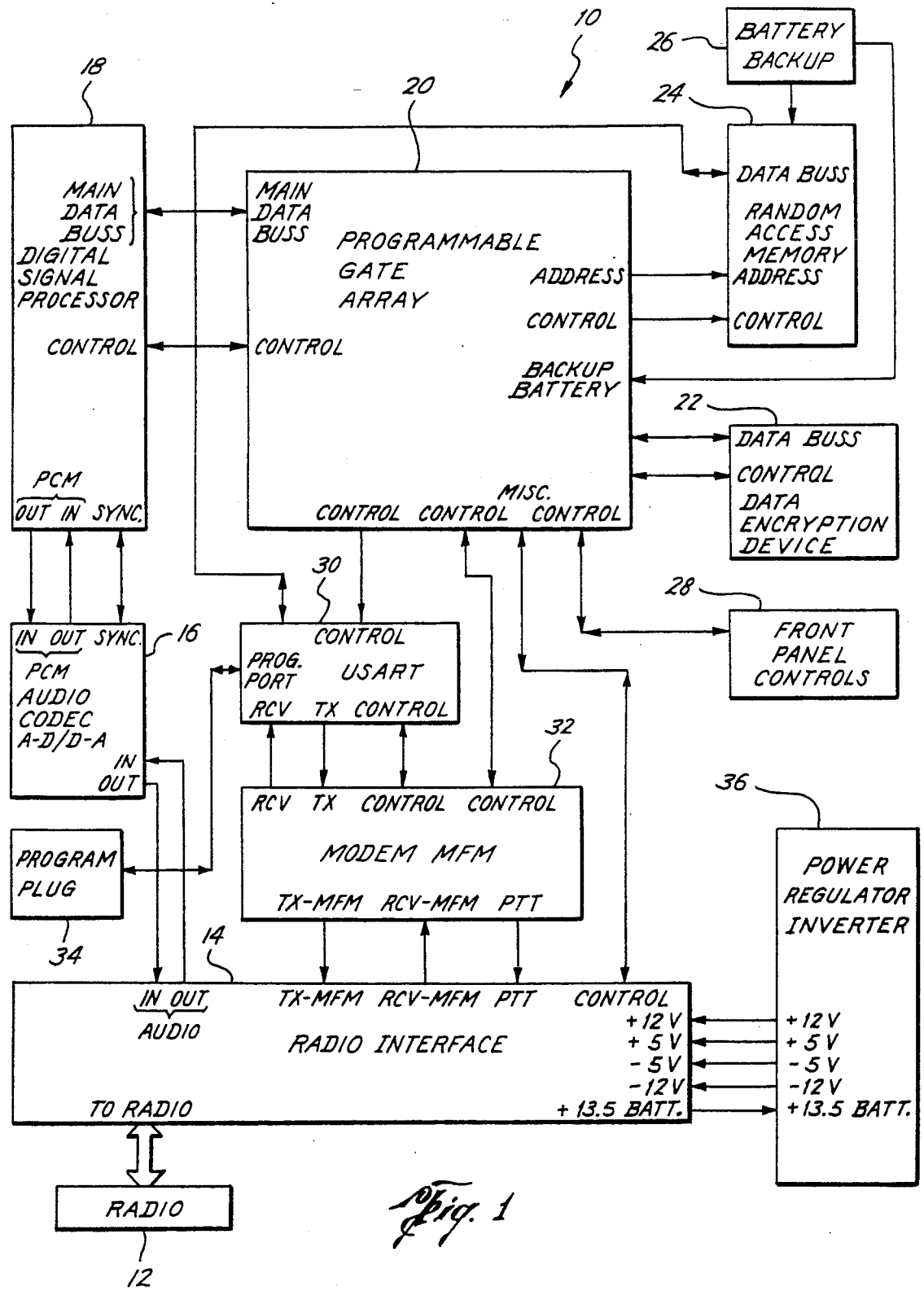
FIG. 1 is a general block diagram of the communication system, voice/data encryption system (VDES), of the present invention.

Turning now to the drawings, FIG. 1 illustrates a communication system or voice/data encryption system (VDES) 10 of the present invention. VDES or system 10 was designed and tested on frequency modulated radios, but can also be used on any (amplitude modulated) AM or (phase modulated) PM radios. System 10 includes a device which is wired to the inside of an existing hand held radio, base station, remote satellite transceiver, mobile radio or repeater system, using a shielded multi-conductor cable. Radio 12 is configured to receive or transmit voice data. Retrofitted into radio 12 or wired to the inside of radio 12 is system 10 which includes the blocks illustrated in FIG. 1. Radio interface 14 is used to couple system 10 with radio 12 such that voice sent through a radio microphone can be input into interface 14 or, encrypted voice sent from a remote radio can be input into interface 14. The design of interface 14 allows system 10 to accommodate a large variety of radio transceivers such that system 10 is retrofittable within standard or conventional radios 12 which have linear or non-linear amplifiers which are not, in particular, spectrally efficient. Furthermore, interface 14 can be configured to accommodate any standard radio 12 chosen which can accept a 6,000 Hz tone. Thus, radio interface 14 allows upgrade of substantially any existing analog radio system to include secure digital communication. This upgrade can be accomplished without replacing the radio equipment already in place.

Once an audio or voice signal is inputted into interface 14 via radio 12, it can be sent into audio codec 16 Codec 16 converts analog to digital and digital to analog with or without filtering the analog input. A preferable codec design is that manufactured by Texas Instruments, Model No. TCM29C-14N. Codec 16 may provide the pulse code modulation (PCM) encoding (i.e., A/D conversion) and PCM decoding (i.e., D/A conversion). Furthermore, codec 16 may come equipped with transmit and receive filtering. Codec 16 is preferably set up for micro law encoding/decoding. Furthermore, codec 16 also handles the analog signals coming from local radio 12 microphone, and also handles the analog signals going to radio 12 audio power amplifier. Codec 16 may operate such that it samples the voice at 6400, 12 bits samples per second. The digitized audio may then be transferred to and from codec 16 at 19.6608 Megabits per second using a synchronous PCM path. If analog signals are being transmitted into codec 16, codec 16 converts those signals to digital, PCM format as shown, and then outputs those encoded signals into digital signal processor 18.

Digital signal processor (DSP) 18 functions to process PCM digital signals sent from codec 16 and/or output processed PCM output signals sent to codec 16 (depending upon whether or not audio is coming from the local microphone or from transmitted, remote radio). DSP 18 can be of numerous designs, but is preferably made by Texas Instruments, Model No. TMS320C17N. If the TMS320C17N chip is used, this chip contains 256 bytes of 16 bit SRAM, 4096 bytes of 16 bit EPROM, dual serial codec 16 interfaces and an on chip crystal oscillator. The TMS230C17N is based on the Harvard Architecture structure. The top speed of this processor is 20.48 megahertz. The present system 10 will generally run processor 18 at 19.6608 Megahertz. Processor 18 handles all the data processing system controls for the present invention. Preferably, processor 18 is a 16 bit microprocessor, which has 8 I/O ports as will be described below. If digital PCM format signals are being transmitted from DSP 18 into codec 16, codec 16 converts those signals to analog as shown and then outputs those analog signals into radio interface 14.

In order to provide logic connection to and from processor 18, programmable gate array (PGA) 20 is shown connected between processor 18 and other hardware found throughout system 10. PGA 20 may be any device which provides programmable standard logic such as, but not limited to, programmable logic devices (PLD), erasable programmable logic devices (EPLD), field programmable logic devices (FPLD), or standard, discreet logic circuits. Preferably, PGA 20 functions as the heart of system 10 interconnect hardware and may be purchased from XILINX Inc., San Jose, Calif., Model No. X3000 series. PGA 20 thereby replaces numerous standard logic circuits and reduces the manufacturing costs and inventory costs of the present system 10. PGA 20 also decreases the power requirements for system 10 and is completely reprogrammable if interconnect changes must be made. Configuration changes can be implemented through a serial programmable read only memory (not shown) within PGA 20 in order to load PGA 20 with its start up configuration. Serial programmable read only memory (SPROM) is preferably purchased from Advanced Micro Devices, Model No. AM1736A-DC. SPROM is a one time programmable device and the format used to store the information in SPROM is proprietary to XILINX ®.

PGA 20 thereby provides hardware interface through main data bus, control between processor 18 and other functional blocks of system 10. Thus, DES codes can be routed from data encryption device 22 via control bus and data bus, through PGA 20, and into either random access memory (RAM) 24 or processor 18. Device 22 may be purchased from Texas Instruments, Model No. TMS75C00. Device 22 is a peripheral device designed to perform the National Bureau of Standards Data Encryption Standard (DES) as specified in Federal Information Processing Standards publication (FIPS PUB), 46 published Jan. 15, 1977. Device 22 is used in the peripheral configuration mode and is interconnected through PGA 20. Furthermore, device 22 as presently configured has a maximum data rate of 2304 bits per second.

RAM 24 is preferably chosen as static RAM and can be purchased from Texas Instruments, Model No. TMS62256. System 10 utilizes all of RAM 24 address spaces which includes but is not limited to 32,768 maximum allocated address spaces. RAM 24 is used to store all of DES keys (master keys) and system variables from device 22 via address line through PGA 20. Furthermore, RAM 24 is protected from memory loss via battery backup 26. Backup 26 may comprise any type of reserve power source accomplished through the use of a nonvolatile controller (not shown) such as those made by Dallas Semiconductor, Model No. DS1210N. Backup 26 supplied through the nonvolatile controller, supports memory retention within RAM 24 for PGA 20 and RAM 24. In addition, backup 26 also controls chip enable signal to RAM 24 during power dropouts, to eliminate erroneous data transfers to and from RAM 26.

As a means for controlling processor 18, device 22 and RAM 24, a front panel control 28 is configured onto the outer panel of system 10 or may be incorporated into radio 12 control panel. Controls 28 are situated as switches (such as poly-dome switches) and LED indicators. The switches and LEDs control the function of system 10 through an outside operator. The operator controls various functions of system 10 by activating switches on front panel control 28 in response to indicator lights on same. The control of the "talk and run" feature is carried forth by activating the appropriate switches on front panel controls 28. Thus, talk and run feature can be initiated by the user and carried forth in processor 18. In order to restrict unauthorized operation of system 10, there is provided a MEDECO ® high security key switch, which is accessible from front panel 28. This MEDECO key switch is used to select four modes of operation which include, but are not limited to, "off", "on", "self testing" and "enable programming".

Also shown in FIG. 1 is universal synchronous/asynchronous receiver/transmitter (USART) 30 which handles all the serial communication between processor 18 and modem 32. Also, USART 30 controls auxiliary RS232 serial data port from an external program plug interface unit 34. USART 30 functions in the interrupted mode and uses a programmable baud rate generator (PBRG) to achieve multiple baud rates to both the modem and the auxiliary RS232 serial data port. The PBRGs output baud rate frequency is controlled by processor 18 through PGA 20 when connected as shown in FIG. 1 A preferable USART may be purchased from ZILOG, Model No. Z85C30N. Shown connected to USART 30 is modem 32 which handles transmitted and received serial NRZ data signals coming from or going into USART 30. Modem 32 is any form of modulator/demodulator which functions in modified frequency modulation (MFM). A suitable modem 32 may be purchased from GLB Enterprises, Model No. HSM-5. Thus, modem 32 is a subassembly for interfacing a digital data source to a radio transceiver to achieve wireless transfer of data to and from remote locations at speeds of 4800 or 9600 baud. The modem selected may be modified to run up to 12,000 baud. Modem 32 may use a direct connection to both the modulator and the demodulator contained within the radio as will be shown in more detail below. Modem 32 has been further designed with a nonadjustable zero-crossing window detector system. This non-adaptive detection has shown to be a problem by causing bit errors in the decoded non-return-to-zero (NRZ), while the received MFM is stable. Thus, modem 32 may be preferably redesigned which uses adaptive window detection but overcomes the non-adaptive detection problems discussed immediately above. Control of modem 32 is provided from programmable gate array 20 through the control bus as illustrated. Furthermore, modem 32 transfers control to and from USART 30 as illustrated. Transmit and receive signals are transferred between USART 30 and modem 32 in accordance with whether or not signals are transmitted or received. Once modem 32 performs its function, transmitted MFM signals are outputted to radio interface 14 during the transmit process flow. Conversely, if receive process flow is activated, then modem 32 receives input MFM through the receive process flow. Transmit and receive flow diagram, and accompanying block diagrams, are discussed in more detail below.

Program plug 34 is shown to accommodate data transmitted or received via RS232 port. Such data may include faxed data, digitized video, or ASCII data, etc. Plug 34 may be preferably chosen as manufactured by."Canon, Model No. DV9-standard. By placing plug 34 external to panel controls 28, a more efficient use of the rear panel and reduction in overall connector size is achieved.

Power regulator invertor 36 is shown to control and regulate the power supplies for system 10. Regulated voltages are produced from interior 36 such as +12, +5, −5, −12 volts DC. Power for system 10 comes through interface cables from radio 12, which supplies an unregulated 13.5 volts DC to system 10. The function of power regulator invertor 36 is to convert the 13.5 volts DC into 5, 12, −5, −12 volts DC. The conversion from 13.5 volts DC may be accomplished through the use of voltage converter Model No. ICL7662N, manufactured by Intersil, linear voltage regulators such as LM340T5 and LM320L5, manufactured by National Semiconductor.

Figure 2:
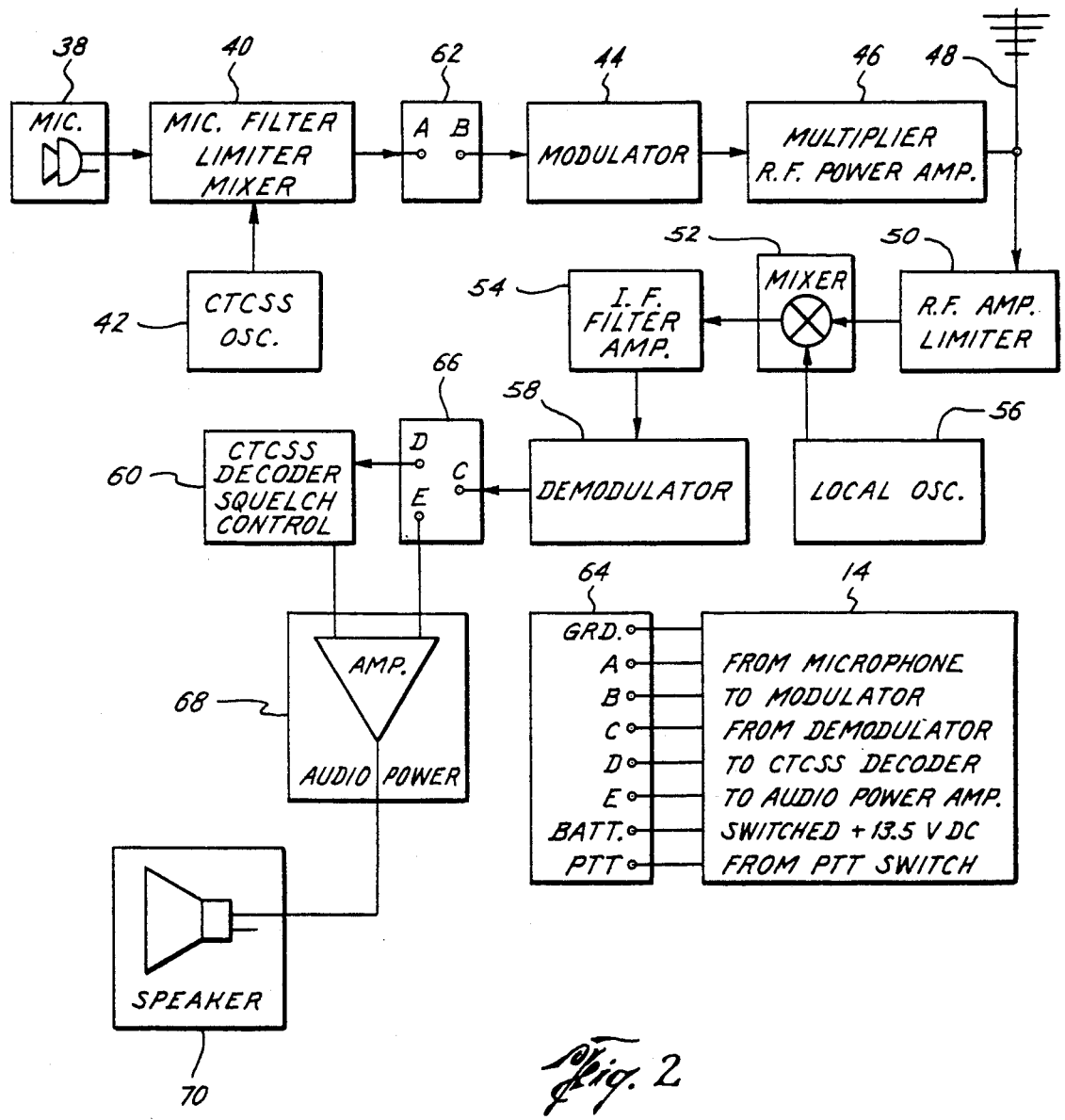
FIG. 2 is a block diagram of a conventional radio modified and/or retrofitted with the present invention.

Referring to FIG. 2, a block diagram is shown of a standard analog radio having modifications to accommodate system 10. Standard transmitter of radio 12 includes: microphone 38, microphone filter limiter mixer 40, continuous tone coded squelch system (CTCSS) oscillator 42, modulator 44, multiplier 46, communication channel 48, R.F. amplifier limiter 50 at received end of channel 48, mixer 52 and I.F. filter amplifier 54. Also included is local oscillator 56 which interfaces with mixer 52 to suffice as receiver tuner. Also, demodulator 58 and CTCSS decoder squelch control 60 receive filtered output from I.F. amplifier 54.

The signal path from terminal A to terminal B of transmit audio block 62 is detailed and shown along with terminals C, D and E and shown in block 64. Furthermore, terminals C, D and E of receive audio block 66 are also shown in block 64. Thus, input from microphone 38 can be routed via conventional radio 12 to terminal A and from terminal A to terminal B to modulator 44 if normal mode operation occurs (i.e., not in secure, encryption mode). If, in secure mode, input from terminal A is not routed to terminal B but is sent to audio out shown in interface 14 of FIG. 1. Thus, in secure mode operation, analog input from microphone 38 is rerouted from radio 12 to audio out of interface 14. Conversely, during decryption of a received signal, terminal C from demodulator is routed, upon receiving proper command, to audio power amplifier 68 through terminal E. Output from control 60 and terminal E provides amplification of the analog output via amplifier 68 into audio speaker 70. Radio interface 14, which interfaces with block 64 coming from radio 12 to system 10, is further described in FIG. 3.

Figure 3:
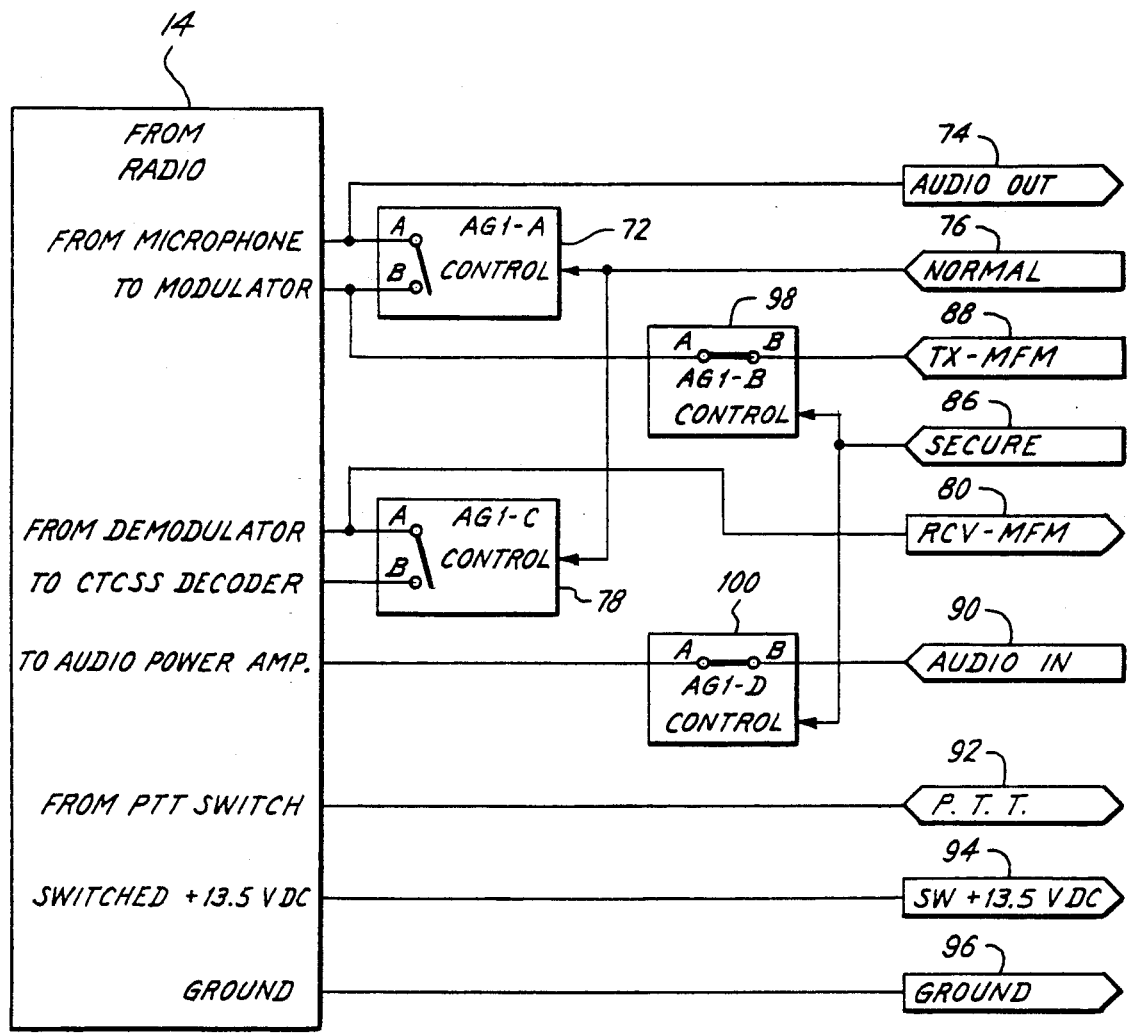
FIG. 3 is a block diagram of radio interface controller of the present invention.

FIG. 3 illustrates a block diagram of radio interface 14 and the way in which interface 14 selectively controls terminals A and B shown in block 64 of FIG. 2. Audio input from microphone 38 resides on terminal A of AG1-A controller 72, wherein modulator 44 is connected to terminal B of AG1-A controller 72. A switch contained within controller 72 dictates whether microphone input is sent to audio out 74 or directly to modulator 44. If normal input 76 is "low" (i.e., does not activate controller 72 such that terminals A and B are not connected), then a secure mode will occur whereby input from microphone 38 is transmitted to audio out 74 of radio interface 14 (see FIG. 1). Furthermore, if normal mode is "high" thereby activating AG1-C controller 78, terminals A and B are coupled such that analog voice from microphone 38 is sent directly to modulator 44. AG1-B controller 82 and AG1-D controller 84 are shown with terminals connected, i.e., when secure mode is activated (i.e., normal mode "low") from secure block 86 such that transmit (TX) MFM 88 and audio in 90 are linked to modulator 44 and amplifier 68. Note that push to talk (PTT) 92, switched 13.5 volts DC 94 and ground 96 are always activated regardless of whether or not radio interface 14 receives secure or normal mode signals.

The secure mode is shown in FIG. 3. In the normal mode, terminals A and B of controllers 72 and 78 are closed, while terminals A and B of controllers 98 and 100 are open. It is preferred that direct connection from demodulator 58 to modem 32 is achieved at all times. This is accomplished with connection from demodulator 58 to receive (RCV) MFM 80. This also allows modem 32 to monitor the received signal at all times, which ensures that any MFM communication will be heard.

FIGS. 2 and 3 illustrate that microphone 38 signal is intercepted between limiter mixer 40 and modulator 44. The signal from limiter mixer 40 may be routed into radio interface 14 if desired. The received signal is intercepted between demodulator 58 and amplifier 68 or CTCSS decoder squelch control 60. This type of interception and rerouting requires no modification to the radios existing configuration. It also allows for normal operation when in the non-secure mode. The power requirements for system 10 are also supplied by the radio, and are routed through the interface cable. The push to talk (PTT) is tapped in the radio 12 and routed through the interface cable.

Figure 4:
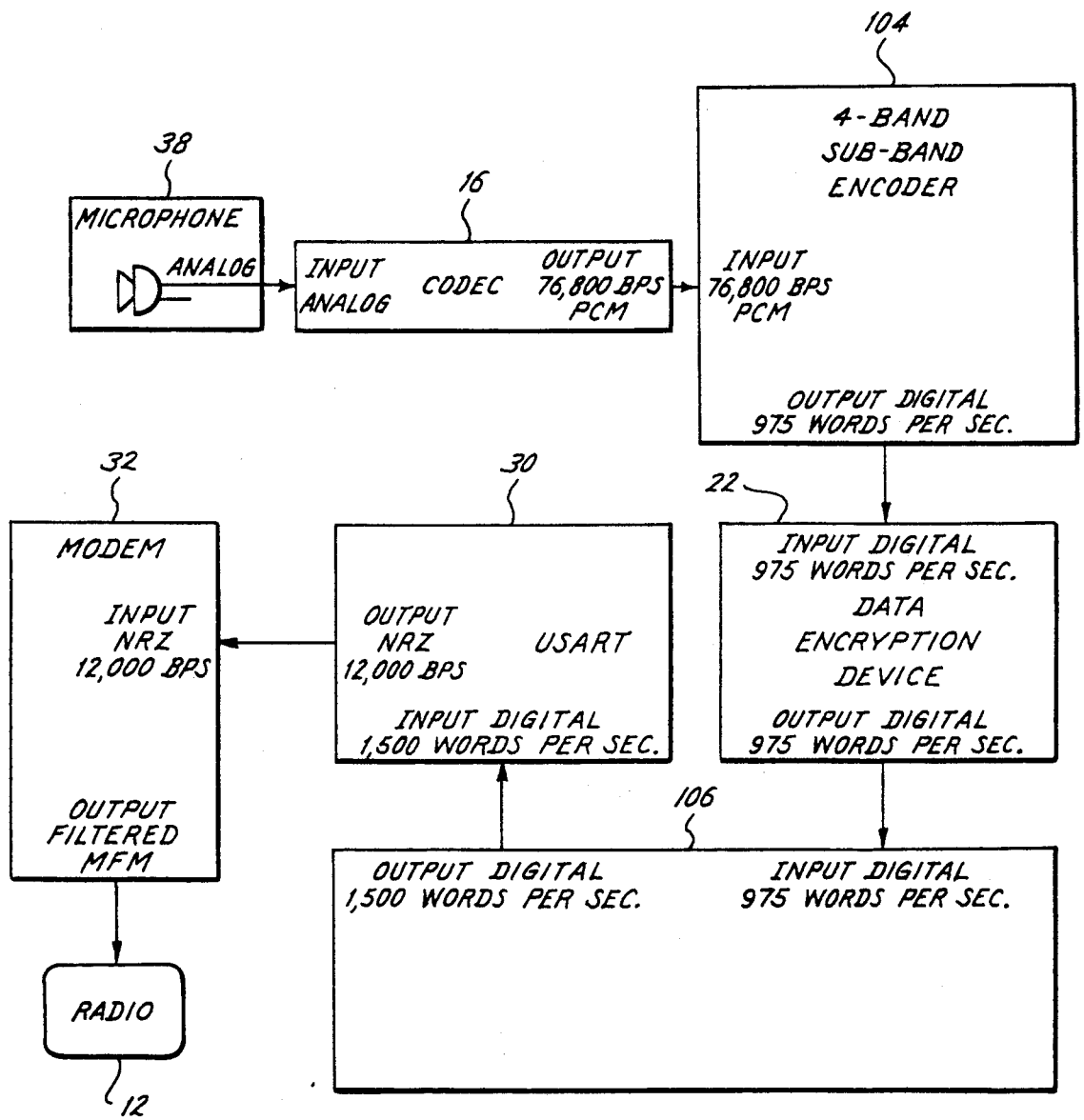
FIG. 4 is a block diagram of the transmission voice process flow of the present invention.

FIG. 4 is a block diagram illustrating transmission voice process flow. The voice signal begins in analog form at microphone 38. Codec 16 then converts the analog signal to digital. Codec 16, also shown in FIG. 1, receives analog input and converts the analog signal to PCM, digital format as serial output of 76,800 bits per second. The digital signal is then compressed by the use of a sub-band encoder 104. Preferably, the present device uses a 4-band sub-band encoder, however, any form of compression of the data bits fall within the scope of this invention. Sub-band encoder 104 produces a bit stream of 975, 8 bit data words per second from the 76,800 bits per second serial input. Sub-band encoder 104 and its method of compressing serial bits is disclosed in more detail later, however, it is understood that encoder 104 is programmed within the digital signal processor 18 such that all compression functions occur within the processor. Once the compressed bit stream exits encoder 104, it is placed into data encryption device 22. Device 22 functions to address DES code and output the corresponding code as 975, 8 bit data words per second. Output from device 22 is then placed in its encrypted form and then routed to a software controlled bit manipulator block 106 residing within processor 18. Block 106 adds control data, forward error correction (FEC), interleaving and packing according to well known principals common in the art. After bit manipulation is achieved, digital input of 975 words per second is increased to 1500 words per second and outputted into USART 30. USART 30 converts the 1500, 8 bit data words per second into a serial bit stream of 12,000 bits per second, which is then outputted to modem 32. Modem 32 converts the 12,000 bits per second of serial data from non return-to-zero (NRZ) to modulated frequency modulation (MFM). This MFM data stream is then sent to radio 12, and more specifically to modulator 44 of radio 12, whereby the MFM output is transmitted over communication channel 48.

Figure 5:
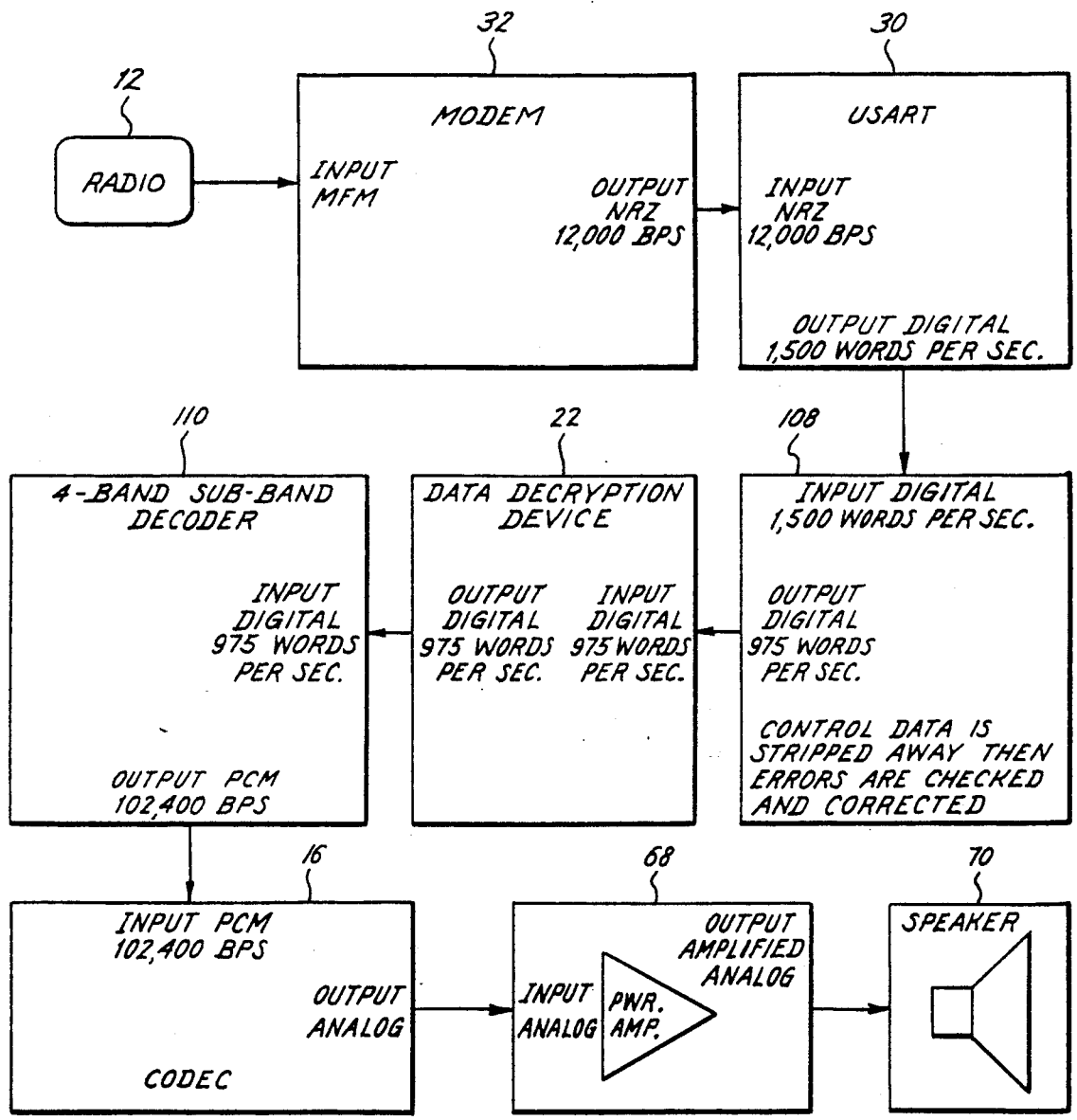
FIG. 5 is a block diagram of the reception voice process flow of the present invention.

FIG. 5 is a block diagram showing reception voice process flow. The signal originates from a remote radio location and is transmitted over channel 48 and then received in its MFM format at local radio 12. Modem 32 then converts the MFM to serial NRZ at 12,000 bits per second. The 12,000 bits per second serial bit stream from modem 32 is then routed to USART 30 where it is then converted from serial format to parallel format of 1500, 8 bit data words per second. The output of USART 30 is then routed to a second bit manipulator block 108. Block 108 functions to strip away control data and then to forward error correct (FEC) corresponding bits and make corrections thereto. The output of block 108 is 975, 8 bit data words per second which are routed to data decryption device 22. Data decryption, as opposed to encryption, addresses digital output in response to corresponding DES code input. Thus, DES-format input is converted to corresponding digital output substantially representing the original analog input. A sub-band decoder 110 then converts the 975, 8 bit data words per second into 102,400 bits per second. Output from decoder 110 is then routed to codec 16 where it is then converted from digital to analog. Sub-band decoding occurs within processor 18, wherein digital-to-analog conversion occurs outside processor 18 and within codec 16. The output of codec 16 is then routed to amplifier 68 which then amplifies the analog output and reproduces that amplified output as sound waves in speaker 70.

Figure 6:
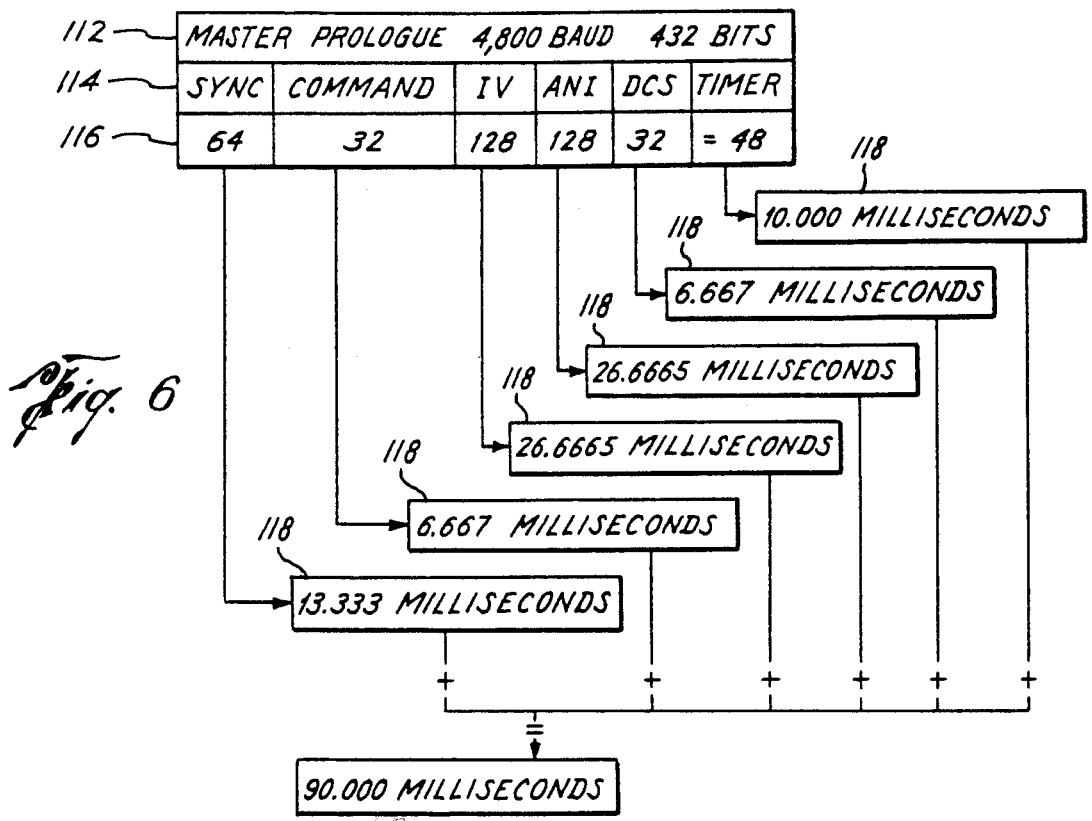
FIG. 6 is a block diagram of the master prologue for controlling subsequent transmission blocks sent through the present invention from a local or remote location.

FIG. 6 is a block diagram illustrating the master prologue used to control processor 18. The purpose of master prologue 112 is to identify the start of each new transmission block transmitted over a communication channel 48 such as a radio wave or telephone line. Master prologue 112 also provides a means for 1) synchronizing data flow (SYNC), 2) transferring a command word (COMMAND), 3) reinitializing the data encryption standard (IV), 4) identifying the transmitting unit (ANI), 5) controlling the squelch of the receiving unit (DCS), and, 6) allowing adequate time for the transmitting and receiving units to alter the modem speed (TIMER), then stabilize, if so instructed by the command word. SYNC, COMMAND, IV, ANI, DCS and TIMER are shown in block 114. The first 64 bits of master prologue 112 are used to allow the receiving unit to synchronize to the transmitting unit. The synchronizing block (SYNC) consists of six 8 bit words, having the hexadecimal value of 00, followed by two 8 bit words, having the hexadecimal value of 7E. The receiving modem uses the first 6 words for synchronization, while USART 30 looks for the last two 8 bit words in order to achieve synchronization with the transmitting unit. The next 32 bits of the master prologue are the command words.

The command word consists of four 8 bit hamming coded words, each of the four words contain only 4 bits of the command data. Bits 0-2 identify the mode which the transmitting unit is in. Bits 3-7 are used to indicate the command in which to process, according to a table in FIGS. 10, 12-14. There are a total of 32 commands which can be issued using the present implementation. The command word identifies the transmitted data format.

The next 128 bits comprise the IV data. The IV data consists of one 128 bit hamming coded block, of which there are 64 bits of IV data. The IV is encrypted by device 22 using the selected master key. The result from this encryption process is used to exclusive-or with the received data. This exclusive-oring causes the received data to return to its original form, i.e., decrypting the data.

The next 128 bits comprise the ANI. This ANI block consists of one 128 bit hamming coded block, of which there are 64 bits of ANI data. ANI is used to identify the transmitting unit and disclose that transmitting unit to the receiving unit. The ANI data is programmed at the time the unit is placed in service, and can be changed at any time.

The next 32 bits comprise the digital coded squelch block (DCS). DCS bits consist of 32 bits of one hamming coded block of which there are 16 bits of DCS data. DCS is used to control the receiving units' squelch. This method of squelch control allow for a more adequate selected signaling. Selective signalling, as commonly used in the art, consist of either CTCSS (sub-audio tones) or a sequence of audible tones to activate the squelch of the receiving unit. By transmitting a DCS which is a direct representative of the master key used for the encryption process, the security of the master key data is maintained. The DCS does not contain any part of the master key data but does allow identification of the master key selected by the transmitting unit. The next 48 bits are used to allow the transmitting and receiving unit to change modem speed, if so instructed by the master prologue. Breakdown of each block and the total number of bits used by each block is shown by reference numeral 116. Furthermore, transmission of each block requires a specific amount of time as indicated by reference numerals 118. The entire master prologue can be transmitted in 90 milliseconds as shown.

Figure 7:
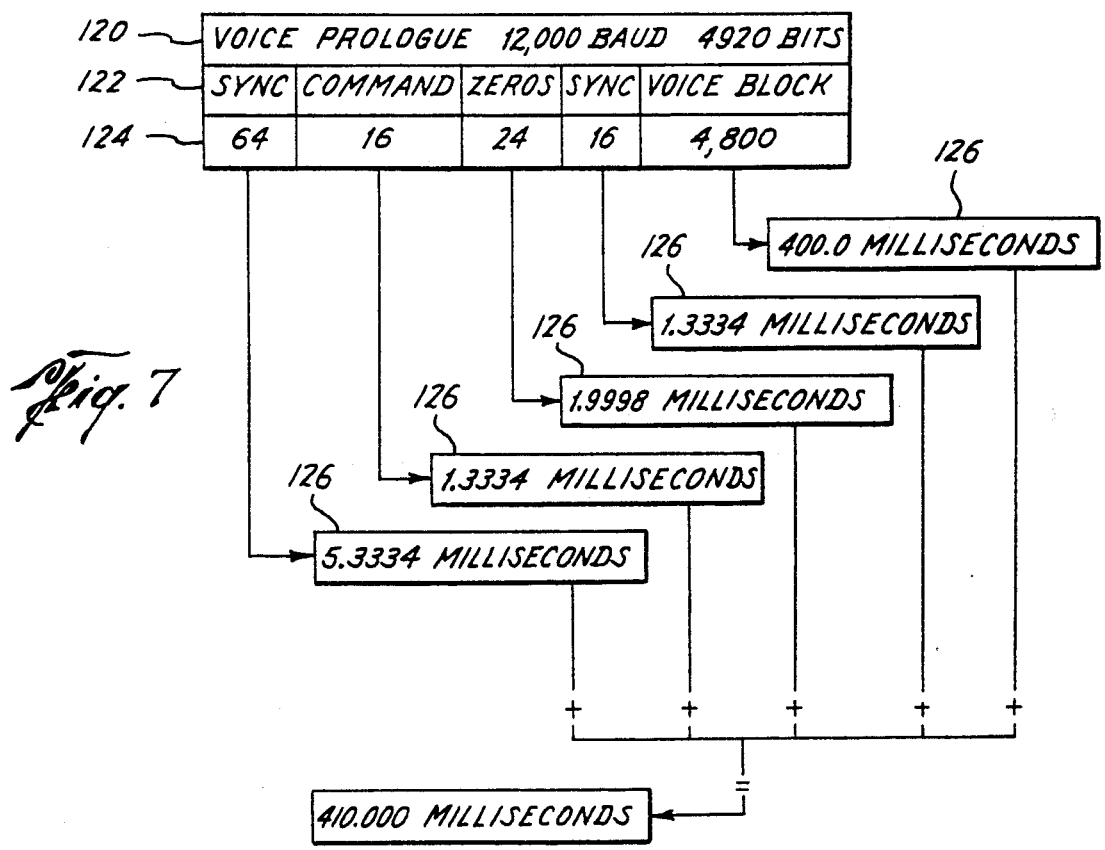
FIG. 7 is a block diagram of the voice prologue used to control subsequent voice signals.

FIG. 7 is a block diagram of voice prologue (VP) 120 used to transfer 4800 bits of encrypted voice data. Voice prologue 120 normally follows master prologue 112. The first 64 bits of data sent over voice prologue 120 are the SYNC block which are the same as the data sent over master prologue SYNC block. The next 16 bits of data are the command word, which is 16 bits of hamming coded data, of which 8 bits are command data. The next 24 bits of data are used to clear the receiver's buffer, and to allow the receiving unit to set up for voice data reception. The next 16 bits are the SYNC words for USART 30, this ensures USART 30 is synchronized. The next 4800 bits are the VOICE BLOCK. The voice prologue 120, when used in the voice mail data transfer, normally follows slave prologue described below. SYNC, COMMAND, ZERO, SYNC and VOICE BLOCK are shown by reference numeral 122, and the representative number of bits for each block are shown by reference numeral 124. Each block, and corresponding bits require a certain amount of transmission time as indicated by reference numeral 126. The total time for voice prologue 120 is shown as 410 milliseconds.

Figure 8:
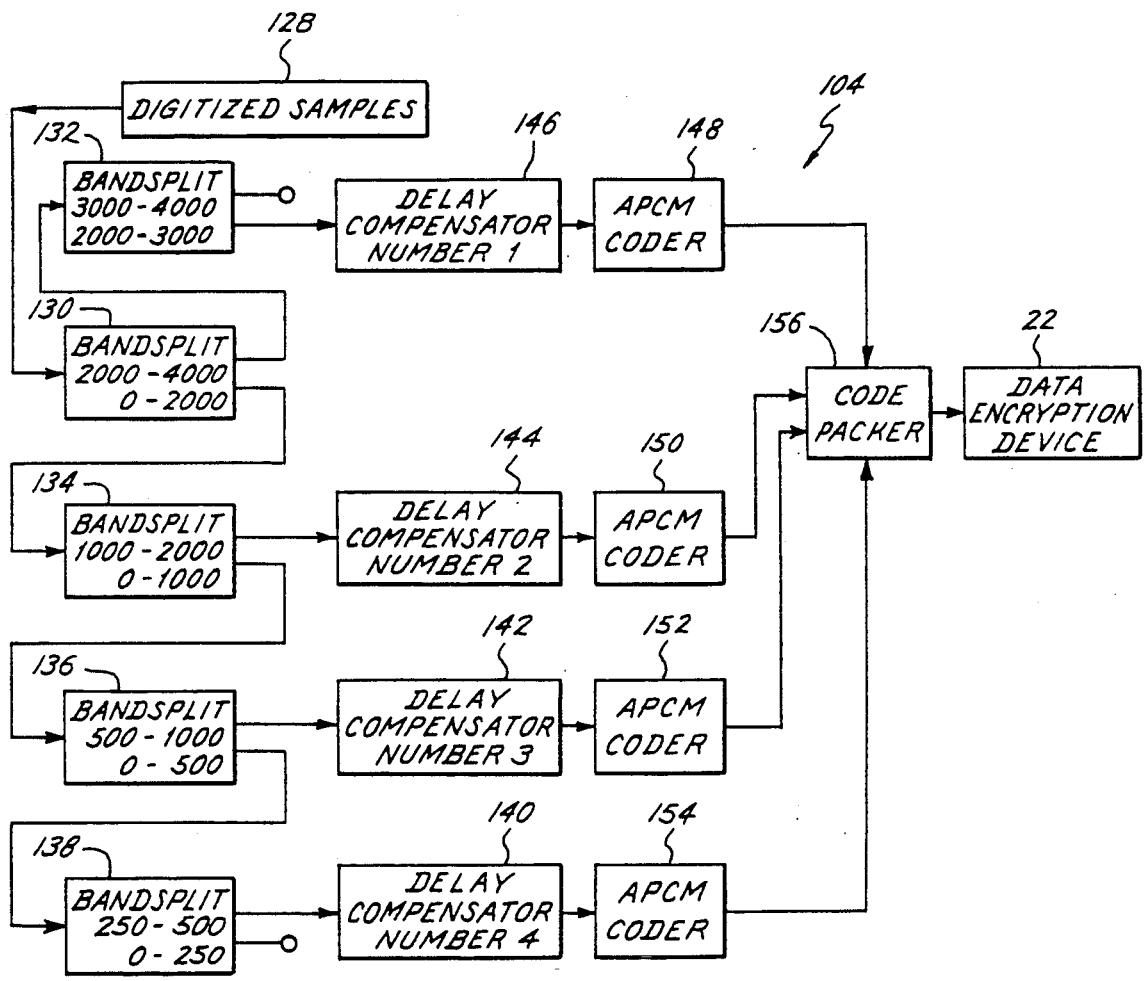
FIG. 8 is a block diagram of the sub-band encoder which is the preferred method for encoding digitized signals used by the present invention.

FIG. 8 is a block diagram of sub-band encoder 104 also shown in FIG. 4. There are numerous methods for sub-banding coding digital data, however, FIG. 8 illustrates one preferred method. Digitized samples 128 are shown entering encoder 104 as digital PCM output leaving codec 16. Digitized signal 128 is routed to the first band splitter 130 which splits the signal in two frequency bands which are 0-2000 hertz and 2000-4000 hertz. The 2000-4000 hertz signal is then transferred to a second band splitter 132 which outputs the 2000-3000 hertz signal but not the 3000-4000 hertz signal. The 0-2000 hertz signal from first band splitter 130 is sent to third band splitter 134. The subsequent 1000-2000 hertz output of third band splitter 134 is transmitted outward, wherein 0-1000 hertz output is sent to a fourth band splitter 136. The resultant output of fourth band splitter 136 in the 0-500 hertz range is sent to fifth band splitter 138. Preferably, only output 250-500 hertz of fifth band splitter 138 is used.

Once the frequency spectrum is preferably split into 250-500 Hz, 500-1000 Hz, 1000-2000 Hz and 2000-3000 Hz, then fourth, third, second and first delay compensators 140, 142, 144 and 146, respectively, delay each appropriate bandwidth such that all bandwidths exit the delay compensators at the same time. Each respective digital bandwidth is then adaptive pulse code modulated (APCM), coded and decimated. The output of APCM coders 148-154 are stored in SRAM 24 and then routed to packer 156. The methodology behind adaptive pulse code modulation and delay compensation is shown in blocks 148-154 and 140-146, respectively. Therefore, a description of how pulse code modulation and delay compensation is achieved is not necessary for the understanding of this invention. Any suitable form of delay compensation and pulse code modulation will suffice to achieve sub-band encoding as long as a true reproduction of the input is recoverable as output. Furthermore, band splitters shown by reference numerals 130-138 are also known in the art. Code packer 156 packs the resultant PCM codes by bit permutation and hamming encoding. The resultant packed form then enters data encryption device 22 as shown in FIG. 8.

Figure 9:
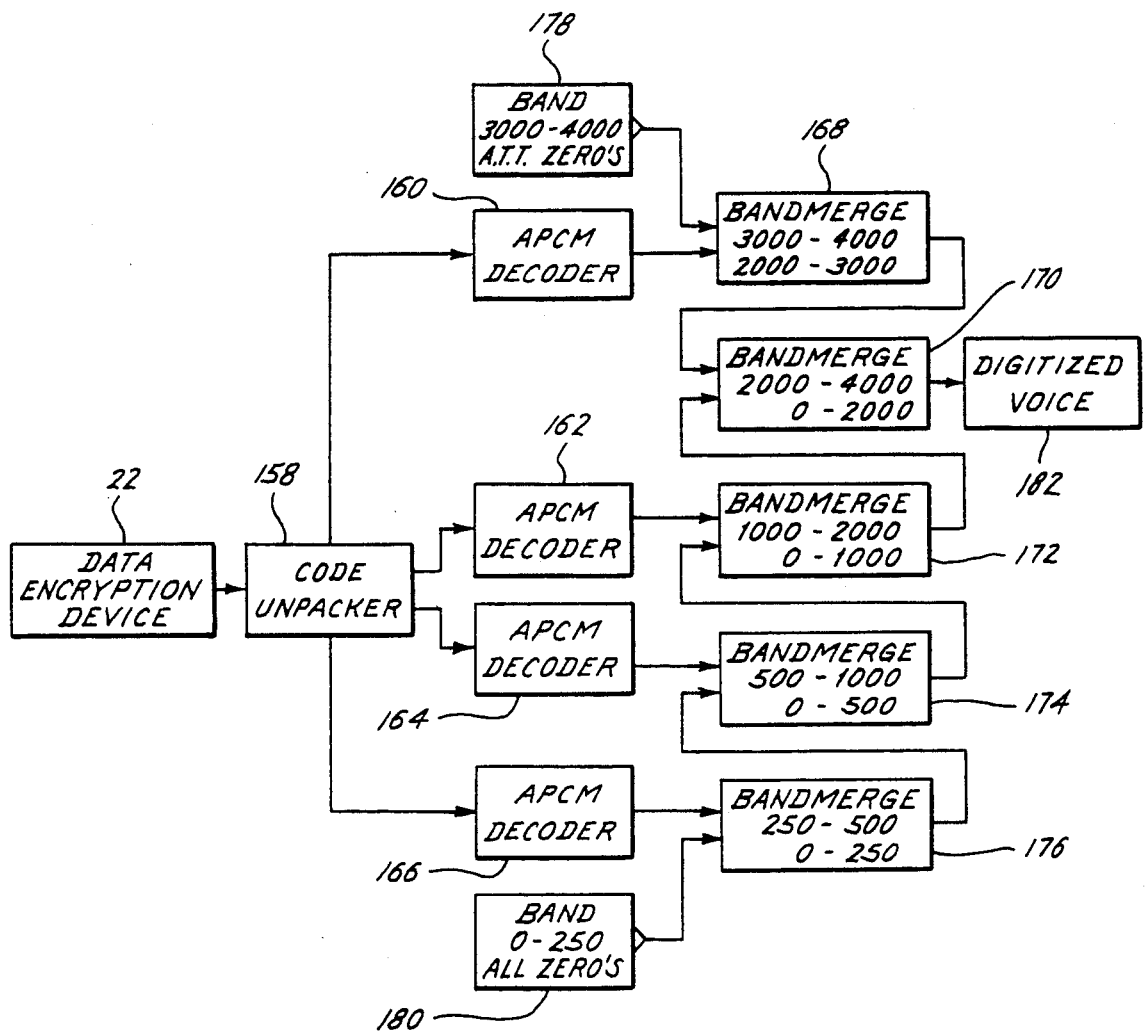
FIG. 9 is a block diagram of the sub-band decoder which is the preferred method for decoding code used by the present invention.

FIG. 9 is a block diagram of the sub-band decoder 110 shown in FIG. 5. Coming from data encryption device 22 are output digital words sent to code unpacker 158. Code unpacker 158 functions to reverse the bit permutation and hamming decode and correct. The resultant four bands coming from unpacker 158 are shown routed to APCM decoders 160-166. Preferably, the four bands represent 250-500 hertz, 500-1000 hertz, 1000-2000 hertz and 2000-3000 hertz. After decoding is achieved, each resultant band is merged through band merge blocks 168-176. Band merge, as opposed to band splitting, is achieved by combining digital data bands into a sum. Band 3000-4000 hertz is filled with all zeros as is band 0-250 hertz. By mixing together outputs of each band merge, (all zeros 178 combined with the output of APCM decoder 160 as well as all of the other output from decoders 162-166 and band 0-250 with all zeros 180), a resultant output of digitized voice 182 is achieved. Digitized voice 182 is then sent to docec 16 as shown in FIG. 5 to then be converted to analog format.

FIG. 10 is a block diagram of system 10 port assignments. Port assignments are defined as a numerical assignment by processor 18 to input/output data location which lie outside of processor 18. Shown in FIG. 10 is port 0/1 used by processor 18 for communication with codec 16 through the use of PCM. Port 2 is shown as read/write information to data encryption device 22. Port 3 is the assignment for read back port. In port 3, bit 0-4 and 8-12 are used to control front panel 28. Bit 5 is used to activate the background beep. The background beep occurs during the reception of a prologue or as an audible indicator or error indicator means. Bit 6 is used to enable the audio increment function of RAM 24 address point of register. This audio increment feature allows a more efficient use of real time. Bit 7 is used to clear RAM 24 address register. This clear signal returns RAM 24 address register to zero. Bit 13 is used to select a frequency of the beep. Bit 13 is used to select one of two divider outputs used to drive background beep. Port 4 is a read back port. Bit 0 and bit 1 of port 4 are used to select the command function of USART 30.

Port 4, bits 2 and 3 are used to control the function of the data encryption device 22. Port 4, bit 4 and 5 are used to select the secure mode or the normal (clear) mode of operation for system 10. Port 4, bit 6 is used to reset the watchdog timer. Watchdog timer (not shown) is used to reset system 10 if processor 18 locks up or gets lost. Watchdog timer is used to monitor processor 18 activity. Processor 18 resets the watch dog timer counter at least every second through setting then resetting port 4, bit 6 or the counter will reach the end of its count and then reset processor 18. Port 4, bits 12-15 are used to select modem 32 speed of operation. The port assignments for port 5 are shown, wherein read bits 0-7 are input from switches on front panel control 28, bit 8 is the input from radio 12 PTT switch. Furthermore, port 5, read bits 13 and 14 are inputs from data encryption device 22, indicating the status. The status indicated by port 5, bits 13 & 14 are bit 13 output data available (ODAV), this shows that DED 22 has data ready to transfer to processor 18 through PGA 20. Bit 14 (busy) is used to indicate that DED 22 is not ready to accept any data from process 18 through PGA 20. Port 5, read bit 15 is used to indicate the status of a mounting bracket lock detect switch. The switch is used to clear RAM 24 at the same moment the mounting bracket lock is unlocked for service. The mounting bracket may be made in such a manner that forced removal of system 10 will result in visable evidence. It shall also be equipped with a MEDECO ® security key lock to limit removal. Port 5, write bits 0-15 are used to store RAM 24 address, which is read and written to, in port 7. The port assignment of port 6 is used to read from and write to USART 30. The port assignment for port 7 is used to read from and write to RAM 24. The reconfigurable logic designed into PGA 20 contains all of the logic required to link and control the interconnections of DSP 10, RAM 24, DED 22, front panel controls 28, USART 30, Modem 32 and radio interface 14 PGA 20 contains the logic necessary to assign and decode the logical input/output ports used by processor 18. PGA 20 also contains the read back data latches and buffers used by ports 2-7.

FIG. 11 is a table showing the pin assignments of auxiliary RS232 serial port connector, which is located on the back of system 10 at each mobile or base station/unit. This connector uses the V.24 standard nine pin "AT" style pin out, with one exception. Pin 9 is an output which indicates whether or not the secure mode is selected by system 10. This connector, Model No. DB9-S, manufactured by Canon Inc. is shielded through the use of ferrite beads and incorporated into system 10.

FIG. 12 is a block diagram of the command word format used in all prologues described earlier. An eight bit word of which bits 0-2 are a binary word representing mode of operation is shown by reference numeral 184. Each binary combination represents a specific secure mode. Thus, if Bit 0 is set to a logic 1, then mode 1 is selected; if Bit 1 is set to a logic 1, then mode 2 is selected; and, if Bit 2 is set to a logic 1, then mode 3 is selected. Only one Bit of either Bit 1, 2 or 3 can be set at any one time. Bits 3-7 are used to indicate the command format which follows or is used for issuing a command. These bits are indicated by reference numeral 186.

FIG. 13 is a chart which shows the command function used in all prologues. A binary code, designated by reference numeral 188, along with hexadecimal code 190, which is assigned to each function 192. The command "voice data" is used in the voice prologue. Conversely, the command "voice data follows" is used in the master prologue in order to indicate that the next prologue which follows is at 12,000 baud and contains encrypted voice data. The command "auxiliary data" port communications is used with the transfer of auxiliary data. The command "response request" is used to activate the answer back capabilities of system 10 in order to allow triangulation. Triangulation is defined herein as a method used to locate any object within the area contained by three receiving antennas. The signal strength received by each of the three antennas is routed to a central computer which analyses the data and gives an approximate distance to said unit from each antenna. The command "response message request" is used to retrieve the voice messages stored in the addressed unit. The command "set master key #1", "set master key #2" and "set master key #3" are used to indicate a new master key is to be loaded into the addressed unit. The commands "set DCS #1", "set DCS #2" and "set DCS #3" are used to indicate a new DCS is to be set in the addressed unit. The command "enter a new ID #" is used to indicate a new ID number is to be loaded in the addressed unit. The command "kill main memory data" is used to clear the main memory or to make the addressed unit brain dead by filling main memory with zeros. The command "voice mail follows" is used to indicate that low speed voice mail will follow this prologue command. The command "voice mail data" is used to indicate that this block contains voice data not at 12,000 baud. The commands "select 9.6K baud", "select 7.8K baud", "select 4.8K baud", "select 2.4K baud" and select 1.2K baud are used to indicate that the prologues which follow is at the specified speed.

FIG. 14 is a table which shows the sub-bands and the number of product code levels which are produced by APCM coders 148-154. The 2000-3000 hertz band, which has a three level product code produced by the APCM coder 148 is shown by reference numeral 194. The 1000-2000 hertz band, which has a three level product code produced by APCM coder 150 is shown as reference numeral 196. The 500-1000 hertz band, which has a seven level product code produced by APCM coder 152 is shown as reference numeral 198. The 250-500 hertz band, which has a 12 level product code produced by APCM coder 154, is shown as reference numeral 200.

FIG. 15 is a table which indicates the sub-bands, product code buffer registers (each product code buffer register corresponds to a product level), levels per product code and subtotal of bits for each sub-band. The 2000-300 hertz band, which stores product codes in BF3, BF7, BFB, BFF, BF13, BF17, BFIB and BFIF in which each buffer register contains three levels or two binary bits, is shown in reference numeral 202. This gives a total, for the 2000-3000 hertz band, of 16 binary bits of information. The 1000-2000 hertz band, which stores product codes in BF2, BF6, BFA, BFE, BF12, BF16, BFIA and BFIE, in which each buffer register contains three levels, or two binary bits, is shown in reference numeral 204. This gives a total, for the 1000-2000 hertz band, of 16 binary bits of information. The 500-1000 hertz band, which stores product codes in BF4, BFC, BF14 and BFIC, in which each buffer register contains seven levels, or three binary bits, is shown in reference numeral 206. This gives a total, for the 500–1000 hertz band, of 12 binary bits of information. The 250–500 hertz band, which stores product codes in BF8 and BF18, in which each buffer register contains 12 levels, or four binary bits, is shown in reference numeral 208. This gives a total, for the 250–500 hertz band, of 8 binary bits of information. The total of all the product codes produced by the four APCM coders 148–154, which is 52 bits, is shown in FIG. 15. This leaves 12 bits available for other uses, such as forward error correction and/or detection.

FIG. 16 is a table of the most error sensitive bits produced by APCM coders 148–154. There are 12 bits which need the most protection from errors. They are BF4 bit 2, BFC bit 2, BF14 bit 2, BF1C bit 2, BF2 bit 1, BF6 bit 1, BFA bit 1, BFE bit 1, BF12 bit 1, BF16 bit 1, BF1A bit 1 and BFIE bit 1. These error sensitive bits correspond to all the bits contained within sub-bands 500–1000 hertz and 1000–2000 hertz.

FIG. 17 illustrates the code packing method used by code packer 156 shown in FIG. 8. The matrix blocks which have an "*" in them are hamming bits. The bits most sensitive to error are bits shown in FIG. 16, and are placed in matrix blocks of FIG. 17 as blocks 17, 19, 21, 23, 25, 27, 29, 31, 33, 31, 36, 37, 41, 42, 44 and 45, wherein these bits are grouped into four blocks of four bits each, thus consisting of block 1, bits 0–3 equalling matrix block 17, 19, 21 and 23. Block 2, bits 0–3 equal matrix block 25, 27, 29 and 31. Block 3, bits 0–3 equal matrix block 33, 34, 36 and 37. Block 4, bits 0–3 equal matrix block 41, 42, 44 and 45. Each block is then encoded using the hamming method, which gives a 3 bit code for each block encoded. Block 1 hamming bits are packed into matrix blocks 51, 52, 53 and 54. Block 2 hamming bits are packed into matrix blocks 55, 56 and 57. Block 3 hamming bits are packed into matrix blocks 58, 59 and 60. Block 4 hamming bits are packed into matrix blocks 61, 62 and 63. The hamming coded blocks error protect 16 of 52 data bits in the matrix block. Thus, 30% of the voice data is protected by the use of hamming coding.

FIG. 18 is a table illustrating the interleaving method chosen by which bits within the matrix of bits shown in FIG. 17 and stored in RAM, are interleaved. Interleaving takes the original data and rearranges the bits to minimize the effects of channel fading and multipath. The unaltered data is shown as reference numeral 210. The data, after interleaving has occurred, is shown as reference numeral 212. The minimum separation between bit 1 and bit 2 has now become 7 bits wide. In the radio environment, there are from 2 to 14 bits corrupted sequentially, depending upon the bit error rate conditions. Interleaving or the method of rearranging bits to minimize the effects of channel facing are known to one of skill in the art.

FIG. 19 illustrates three tables showing the three basic types of secondary prologues. The first table, reference number 214, is the slave prologue. In addition, reference 216 and 218 represent program prologue and data prologue, respectively. Shown in the slave prologue 214, is a sequence including 64 bits of SYNC data, 32 bits of hamming coded COMMAND data and 128 bits of hamming coded ADDRESS data. The ADDRESS data is used to point to a particular remote system 10 for data transfer. SYNC, COMMAND and ADDRESS data in program prologue 216 and data prologue are typically the same as the slave prologue. Program prologue 218 has an additional 64 bits of data information. Data prologue has 16 separate 16 bit hamming coded data blocks each having 8 bits of information from the auxiliary data port.

Figure 20:
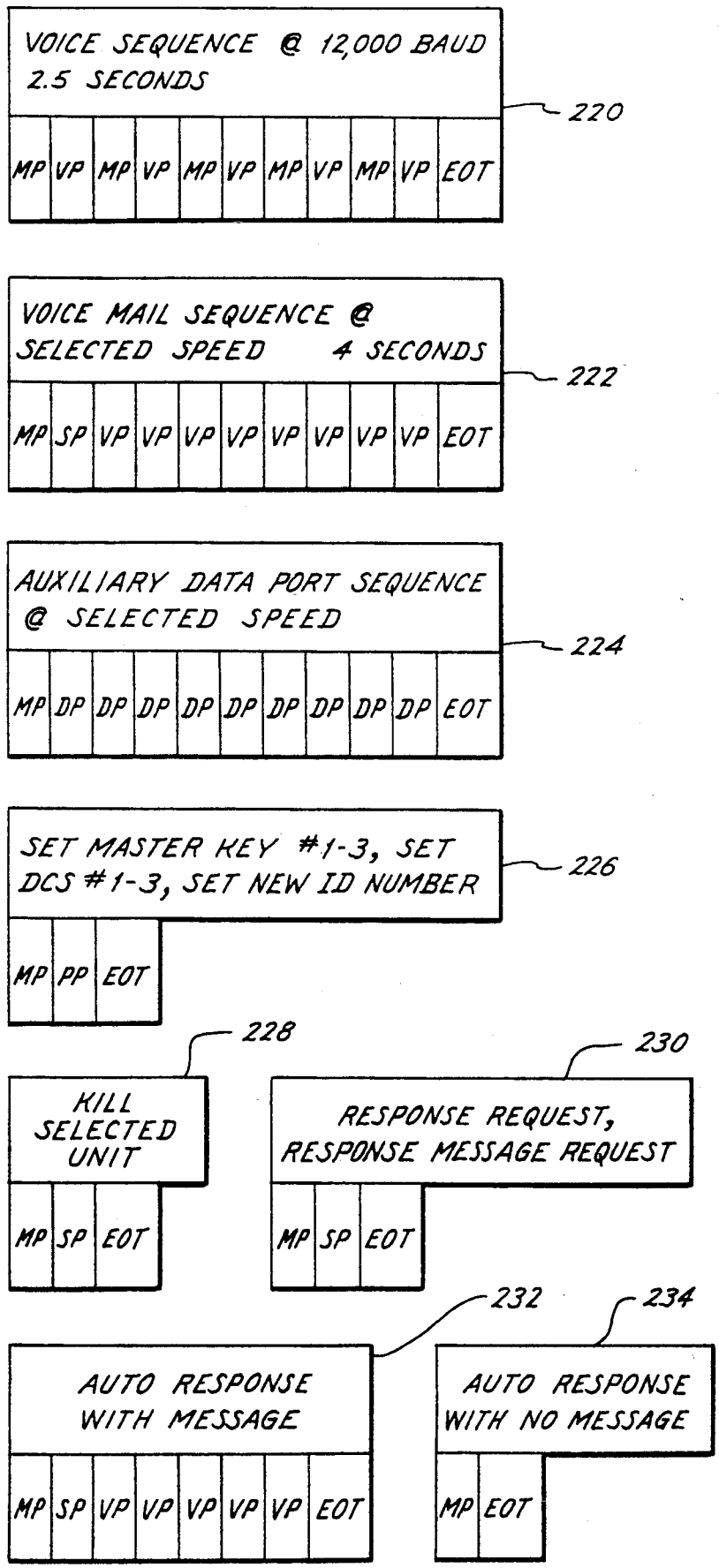
FIG. 20 is a group of tables showing sequence of encrypted voice data transfer, voice mail data transfer, auxiliary data port transfer, changing of master key, kill memory medium, requesting voice mail message, responding to request for voice mail and responding to response request command.

FIG. 20 illustrates a group of tables indicating sequence for prologue blocks used to assemble a message. System 10 shall store the input messages in a packed form in RAM. When the input message is completed, processor 18 can transmit the sequence in reference 222 with the command word "talk and run to base". The base unit can receive this message in its entirety and then play the message to the base operator which is preceded by two beeps. Real time voice data transfer occurs during voice sequence block 220 transmitted at 12,000 baud at 2.5 seconds, or longer, of voice data. As shown in voice sequence 220, master prologue begins the sequence followed by voice prologue then master prologue, etc. Voice mail sequence block 222 can be transmitted at various speeds during a period of 4 seconds or longer. Master prologue is followed by slave prologue, then voice prologue, etc. Auxiliary data port sequence 224 shows the sequence of auxiliary data port transfer beginning with master prologue followed by data prologue. Set master key sequence 226 functions to set keys 1–3, DCS 1–3 and changing of the ID number beginning with master prologue followed by program prologue. Kill selected unit sequence 228 demonstrates the sequence used for killing main memory of system 10 and the addressing unit therein. Master prologue begins the sequence followed by slave prologue. Response request, response message request sequence 230 demonstrates the sequence used for requesting a response or requesting a voice mail message from an addressed unit. Master prologue begins the sequence followed by slave prologue. Reference numeral 232 indicates audio response with message sequence for automatically responding to a request for voice mail. Similarly, audio response with no message is indicated in block 234 and illustrates the sequence for automatically responding to a response request command. The sequences referred to herein are all created in machine language software.

The general subject matter to which system 10 relates is a microprocessor controlled voice/data encryption unit for use as an after market device on communication systems. The following list includes the problems faced by those working in the digital radio, data encryption and data recovery areas: (i) digital radio communication protocol versus bandwidth; (ii) data recovery using forward error detection (FED); (iii) data encryption standard (DES) modes of operation; and, (iv) synchronization.

Digital radio communication protocol versus bandwidth involves requiring secure radio communication over a limited bandwidth such that radio communication can be achieved in a spectrally efficient manner. The Federal Communication Commission (FCC) has set very tight standards as to the transmitted spectrum which can be occupied by any one transmitter on any one channel. The standards have recently been tightened each time the FCC reevaluates the radio spectrum. This tightening of bandwidth allocation is mainly due to the overgrowing number of radios which are required to satisfy the needs of the public, government and the commercial user. This constant reduction in channel bandwidth has only been a problem for the last 25 years. Thus, each time FCC changes the limits, radio manufacturers must go through a redesign phase. The radios that were sold using the older limits were normally not replaced by the user until mechanically unrepairable or economically affordable. This reaction by the user causes the radio spectrum to be mixed with various radio standards, which in some cases cause errors or other problems. It is the responsibility of the frequency coordinator to minimize these problems. This invention helps to reduce the problems by making more efficient use of the limits available. When the user chooses to upgrade their radio systems to a secure digital communication system, the use of this invention will eliminate the need to replace all their radios and repeaters with new units. Simply, current and future users can retrofit their radios with the present invention, system 10, to achieve digital communication.

Generally speaking, when more bits per hertz are transmitted, the more sensitive the protocol becomes due to the effects encountered in the radio environment. The industry has in the past developed their own protocols or they have used protocols which allow the simplest and fastest communications. By using modified frequency modulation (MFM), the present invention is able to transmit 12,000 bits per second of data through a 15,000 hertz bandwidth channel. The faster communication provided by MFM is fairly simple to incorporate and enables the user to minimize channel effects, while doubling bit rate over conventional modulation techniques such as frequency shift keying (FSK).

In the field of data recovery, the present invention utilizes hamming coding. Hamming coding is known to those of skill in the art and allows for a reduction in bit errors received by using said coding methods. This invention also uses interleaving to reduce the effects found in the radio environment. Shown in FIG. 18, data is arranged in a numerical sequence and changes are made to that data such that they are interleaved or rearranged in swapped positions. This form of interleaving is used on each pair of 8 bit words in the interleaved block. This type of bit permutation is relatively easy to accomplish by the use of exclusive-oring the data block. The same sub routine which is used for the interleaving can be used for the deinterleaving, thus reducing the required program memory overhead.

According to the Federal Information Processing Standards Publication 81, there are primarily four modes of operation for the data encryption standard which have been approved by the National Bureau of Standards. These modes are as follows: (i) electronic code book (ECB) mode, (ii) cipher block chaining (CBC) mode, (iii) cipher feedback (CFB) mode, and (iv) output feedback (OFB) mode. The industry normally chooses a mode which is compatible to the communication protocol's data reliability. The ECB, CBC and CFB modes route the received data through the encryption/decryption process. For each bad bit received there are 50% errors returned by the DED 22. There is only one mode which has no bit error extension, during the encryption/decryption process. This mode is the "output feed back" mode. The output feed back mode was chosen for the present system 10. To maintain digital data security on a voice, the output-feed back mode requires the use of an initiation vector (IV).

The IV is 64 bits in length, hamming encoded, which makes the IV 128 bits. The IV is then interleaved. IV is derived from digital voice data samples, which are taken during the transmit cycle of system 10 as shown in FIG. 4. This method of generating IV will result in a large variation in the IV used. There are few sources which are more randomized than the human voice. Data from the last sub-band coded and packed block is exclusive-ored with the unit's address (ANI), the result of which is used for the IV.

Asynchronous data communications, incorporates the synchronization data into each 8 bits of data transmitted. This results in 11 to 12 bits of data being transmitted for each 8 bits of information. The results are a lowering of the information flow. Synchronous data communications, do not incorporate synchronization data into the information data. This results in a higher rate of information transfer. The only requirement necessary with synchronous communication is the use of starting SYNC word. This SYNC word is used to synchronize the receiver to the transmitter. Once the SYNC word is located by the receiver, the transmitter and receiver remain in SYNC, locked until the data stops or long term interferences are encountered. In system 10, synchronization from the transmitter to the receiver is accomplished through the use of a prologue. The first block in the prologue is the SYNC block (see FIG. 6). The SYNC block is composed of six 8 bit data words followed by two 8 bit data words. The first six data words have the hexadecimal value of 00. The next two 8 bit data words have the hexadecimal value of 7E. In the receiver, modem 32 uses the first six data words for synchronization, and USART 30 uses the next two data words for synchronization. Once the USART finds the SYNC words in a data stream, the receiver is SYNC locked to the transmitter 8 bit data format.

To maintain the synchronization over long periods of conversations, the transmitting unit will retransmit the master and voice prologues 112 and 120, respectively, twice every second. This retransmission forms a new IV, which causes the encryption mapping to change. This retransmission also allows for a late entry for authorized listeners, thus minimizing the loss of communications, due to fading or multipath effects on the channel.

The foregoing description of the present invention has been directed to particular preferred embodiments. It will be apparent, however, to those skilled in the art that modifications and changes to the present system may be made without departing from the scope and spirit of the invention. For example, numerous bit rates, frequency bandwidths, processor architecture and/or modems, etc. can be utilized and configured in any fashion as long as the desired encryption/decryption of the present invention is obtained. Therefore, it is the applicants' intention in the following claims to cover all such equivalent modifications and variations which fall within the true spirit and scope of this invention.

What is claimed is:

1. A communication system for providing secure communication over a communication channel, comprising:
   a conventional radio capable of transmitting and receiving non-secure analog signals;
   means for converting said radio into a DES-encryption device, including:
   a codec coupled to receive said non-secure analog signals and convert said analog signals into pulse code modulated digital signals;
   a signal processor coupled to receive said pulse code modulated digital signals and convert said digital signals into a plurality of sub-band codes in response to a series of prologues transmitted over said communication channel;

means for exclusive-oring DES codes with respective said sub-band codes to produce modified DES-encrypted signals;

a modem for transmitting said modified DES-encrypted signals over said communication channel in MFM format in response to said series of prologues transmitted over said communication channel;

means for converting said radio into a DES-decryption device, including:

said modem for receiving said modified DES-encrypted signals and converting said modified DES-encrypted signals from MFM to NRZ format;

said signal processor coupled to receive NRZ signals with said NRZ format and perform DES-decryption and sub-band decoding of said NRZ signals; and, said codec coupled to convert said decrypted and decoded signals into analog output.

2. The system as recited in claim 1, wherein said communication channel is a radio channel having a bandwidth less than 15 KHz.

3. The system as recited in claim 1, wherein said communication channel is a telephone line.

4. The system as recited in claim 1, further comprising means for retrofitting said radio with a plurality of panel controls including a plurality of secure modes.

5. The system as recited in claim 1, further comprising means for retrofitting said radio with a plurality of panel controls including a plurality of operation modes.

6. The system as recited in claim 1, further comprising a radio interface attachable between a wide variety of conventional non-secure said radios and said DES-encryption and decryption device.

7. The system as recited in claim 1, further comprising a universal synchronous/asynchronous receiver/transmitter having at least one port for receiving auxiliary data to be transmitted as said secure communication over said radio channel.

8. The system as recited in claim 7, wherein said auxiliary data is sent from external sources including fax, digitized video and ASCII.

9. The system as recited in claim 7, wherein said universal synchronous/asynchronous receiver transmitter including a programmable baud rate generator to achieve multiple baud rates to both said modem and said auxiliary data port.

10. A device for converting analog signals to modified DES-encrypted digital signals and transmitting the modified DES-encrypted signals over a radio channel, comprising:

a conventional radio including a microphone capable of receiving said analog signals;

a codec, retrofitted within said radio, for receiving said analog signals and for converting said analog signals into digital, pulse code modulated signals;

a digital signal processor having a memory medium, retrofitted within said radio, for receiving and compressing said pulse code into a plurality of sub-band codes and storing said sub-band codes within said medium in accordance with a predetermined encoding algorithm;

means for selecting a DES encryption code from a data encryption device retrofitted within said radio and storing said DES code within said medium;

means for exclusive-oring said stored sub-band codes with said stored DES codes to produce said modified DES-encrypted signals;

a series of prologues transmitted over said radio channel for controlling said DES-encrypted signals from at least one remote location; and, a modem for transmitting said DES-encrypted signals in MFM format in response to said prologues.

11. The device as recited in claim 10, further comprising customizeable circuitry for interconnecting devices which include said radio, codec, digital signal processor, data encryption device and memory medium.

12. The device as recited in claim 11, wherein said customizeable circuitry comprises either a programmable gate array, a programmable logic device, erasable programmable logic device or field programmable logic device.

13. The device as recited in claim 10, further comprising a universal synchronous/asynchronous receiver/transmitter having at least one port for receiving auxiliary data to be transmitted as said modified DES-encrypted signals.

14. The device as recited in claim 10, wherein said radio is a conventional radio retrofittable to transmit said modified DES-encrypted signals.

15. The device as recited in claim 10, wherein said radio channel having a frequency bandwidth less than 15 KHz and capable of receiving at least 2 bits/Hz.

16. The device as recited in claim 10, further comprising external Data Terminal Equipment for sending and receiving data to and from said device at varying bit rates.

17. The device as recited in claim 10, wherein said data encryption device operates in the output feedback mode of operation.

18. The device as recited in claim 10, wherein said data encryption device comprises a plurality of security keys of which at least one master key can be accessed and rekeyed via a program prologue from said series of prologues transmitted over said radio channel.

19. A device for converting modified DES-encrypted digital signals received over a radio channel to analog signals, comprising:

a conventional radio including an antenna capable of receiving said modified DES-encrypted digital signals;

a modem, retrofitted within said radio, for converting from MFM format to serial NRZ format said modified DES-encrypted signals;

means, retrofitted within said radio, for data bit converting said serial NRZ format to 8-bit parallel NRZ format, for stripping control data bits from said serial NRZ format and for forward error correcting bit errors discovered within said serial NRZ format;

a digital signal processor, retrofitted within said radio, programmed to receive said 8-bit parallel NRZ format and perform DES-decryption and sub-band decoding of NRZ signals with said parallel NRZ format;

a codec, retrofitted within said radio, coupled to convert said decrypted and decoded signals into analog output; and, amplifying means, coupled to said analog output for amplifying said output.

20. The device as recited in claim 19, wherein said amplifying means further comprising a speaker means for listening to non-secure amplified analog output from said radio.

21. The device as recited in claim 19, wherein said DES-decryption and said sub-band decoding utilizing decoding algorithms opposite that of encoding algorithms used to produce said modified DES-encrypted digital signals.

* * * * *